US012804190B2

(12) United States Patent
Blaeser et al.

(10) Patent No.: US 12,804,190 B2
(45) Date of Patent: *Nov. 17, 2026

(54) APPARATUS AND METHOD FOR INTER PREDICTION OF A TRIANGLE PARTITION OF A CODING BLOCK

(71) Applicant: Huawei Technologies Co., Ltd., Shenzhen (CN)

(72) Inventors: Max Blaeser, Munich (DE); Zhijie Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,764

(22) Filed: Oct. 4, 2024

(65) Prior Publication Data

US 2025/0184523 A1 Jun. 5, 2025

Related U.S. Application Data

(63) Continuation of application No. 17/225,939, filed on Apr. 8, 2021, now Pat. No. 12,143,625, which is a (Continued)

(51) Int. Cl.
*H04N 19/52* (2014.01)
*H04N 19/176* (2014.01)
*H04N 19/96* (2014.01)

(52) U.S. Cl.
CPC ........... *H04N 19/52* (2014.11); *H04N 19/176* (2014.11); *H04N 19/96* (2014.11)

(58) Field of Classification Search
CPC .... H04N 19/119; H04N 19/105; H04N 19/52; H04N 19/159; H04N 19/513;
(Continued)

(56) References Cited

U.S. PATENT DOCUMENTS 8,630,350 B2 * 1/2014 Wang .................. H04N 19/573 375/240.16
9,860,556 B2 * 1/2018 Jeon .................... H04N 19/114
(Continued)

FOREIGN PATENT DOCUMENTS

CN 1142728 A 2/1997
CN 107005709 A 8/2017
(Continued)

OTHER PUBLICATIONS

Liao et al.; "CE10.3.1.b: Triangular prediction unit mode;" Joint Video Exploration Team (JVET) of ITU-T SG 16 WP 3 and ISO/IEC JTC 1/SC 29/WG 11, 12th Meeting: Macao, CN, Oct. 3-12, 2028, JVET-L0124-v1 (Year: 2018).
(Continued)

*Primary Examiner* — Daniel Chang
(74) *Attorney, Agent, or Firm* — Conley Rose, P.C.

(57) ABSTRACT

An apparatus and method are provided for inter prediction of a current geometric partition of a coding block. When the coding block is enabled for a geometric partition merge mode, a merge candidate list for the coding block partitioned into two geometric partitions including the current geometric partition is generated. The merge candidate list generation comprises deriving one or more spatial merge candidates from neighboring coding units, and directly or immediately deriving one or more temporal motion vector predictions (MVPs). An uni-prediction MV is derived as a motion vector of the current geometric partition based on the merge candidate list. The current geometric partition of the coding block is predicted based on the uni-prediction MV to obtain a predicted value of the current geometric partition.

20 Claims, 25 Drawing Sheets

Related U.S. Application Data continuation of application No. PCT/CN2019/109991, filed on Oct. 8, 2019.

(60) Provisional application No. 62/742,921, filed on Oct. 8, 2018.

(58) Field of Classification Search
CPC .... H04N 19/137; H04N 19/139; H04N 19/51; H04N 19/577; H04N 19/176
See application file for complete search history.

(56) References Cited

U.S. PATENT DOCUMENTS

| | | | | |
|---|---|---|---|---|
| 2009/0304084 | A1 | 12/2009 | Hallapuro et al. | |
| 2012/0121017 | A1 | 5/2012 | Chen et al. | |
| 2012/0128072 | A1 | 5/2012 | Kobayashi et al. | |
| 2012/0134415 | A1 | 5/2012 | Lin et al. | |
| 2012/0230408 | A1 | 9/2012 | Zhou | |
| 2012/0320984 | A1 | 12/2012 | Zhou | |
| 2013/0114720 | A1 | 5/2013 | Wang et al. | |
| 2013/0128974 | A1* | 5/2013 | Chien | H04N 19/17 375/240.15 |
| 2013/0128977 | A1* | 5/2013 | Yu | H04N 19/463 375/240.12 |
| 2013/0202037 | A1* | 8/2013 | Wang | H04N 19/52 375/E7.125 |
| 2013/0202038 | A1* | 8/2013 | Seregin | H04N 19/52 375/240.15 |
| 2014/0023140 | A1* | 1/2014 | Wahadaniah | H04N 19/573 375/240.12 |
| 2014/0211857 | A1* | 7/2014 | Sugio | H04N 19/96 375/240.16 |
| 2014/0219357 | A1* | 8/2014 | Chuang | H04N 19/593 375/240.16 |
| 2015/0092839 | A1 | 4/2015 | Chien et al. | |
| 2015/0156487 | A1* | 6/2015 | Tao | H04N 19/58 375/240.02 |
| 2015/0271489 | A1 | 9/2015 | Sugio et al. | |
| 2018/0014011 | A1* | 1/2018 | He | H04N 19/593 |
| 2018/0070100 | A1 | 3/2018 | Chen et al. | |
| 2018/0101967 | A1* | 4/2018 | Hong | G06T 3/067 |
| 2018/0176596 | A1* | 6/2018 | Jeong | H04N 19/82 |
| 2018/0376149 | A1* | 12/2018 | Zhang | H04N 19/463 |
| 2018/0376164 | A1* | 12/2018 | Zhang | H04N 19/196 |
| 2019/0098299 | A1* | 3/2019 | Park | H04N 19/105 |
| 2019/0110058 | A1* | 4/2019 | Chien | H04N 19/52 |
| 2019/0230376 | A1* | 7/2019 | Hu | H04N 19/46 |
| 2019/0273921 | A1* | 9/2019 | Abe | H04N 19/176 |
| 2019/0335181 | A1* | 10/2019 | Abe | H04N 19/139 |
| 2019/0379901 | A1* | 12/2019 | Chiang | H04N 19/105 |
| 2020/0014948 | A1* | 1/2020 | Lai | B25J 13/08 |
| 2020/0021845 | A1* | 1/2020 | Lin | H04N 19/105 |
| 2020/0029087 | A1* | 1/2020 | Lim | H04N 19/44 |
| 2020/0029092 | A1* | 1/2020 | Rath | H04N 19/13 |
| 2020/0045309 | A1* | 2/2020 | Xu | H04N 19/159 |
| 2020/0084452 | A1* | 3/2020 | Liao | H04N 19/137 |
| 2020/0107016 | A1 | 4/2020 | Li et al. | |
| 2020/0195973 | A1* | 6/2020 | Xu | H04N 19/119 |
| 2020/0213593 | A1* | 7/2020 | Chiang | H04N 19/513 |
| 2020/0404267 | A1* | 12/2020 | Liao | H04N 19/119 |
| 2021/0058617 | A1* | 2/2021 | Reuze | H04N 19/70 |
| 2021/0067776 | A1* | 3/2021 | Reuze | H04N 19/573 |
| 2021/0160527 | A1* | 5/2021 | Chuang | H04N 19/105 |
| 2021/0360274 | A1* | 11/2021 | Hsiao | H04N 19/176 |
| 2021/0385474 | A1* | 12/2021 | Lim | H04N 19/44 |
| 2021/0392322 | A1* | 12/2021 | Chiang | H04N 19/51 |

FOREIGN PATENT DOCUMENTS

| | | | |
|---|---|---|---|
| CN | 108353165 | A | 7/2018 |
| JP | 2013251752 | A | 12/2013 |
| JP | 2016195452 | A | 11/2016 |
| JP | 2018142972 | A | 9/2018 |
| JP | 2022505731 | A | 1/2022 |
| WO | 2017076221 | A1 | 5/2017 |
| WO | 2018141416 | A1 | 8/2018 |

OTHER PUBLICATIONS

Max Blaser, et al., CE10: Results on Geometric Partitioning (Experiments 3.2.a-3.2.c), Joint Video Experts Team (JVET) of ITU-T SG 16 WP 3 and ISO/IEC JTC 1/SC 29/WG 11-12th Meeting: Macao, CN, Oct. 3-12, 2018, [JVET-L0417], Sep. 26, 2018, pp. 1-5, Internet URL: http://phenix.it-sudparis.eu/jvet/doc_end_user/documents/12_Macao/wg11/JVET-L0417-v2.zip> JVET-L0417 v1 .docx>.

RWTH Aachen University et al., "Description of SDR and 360 video coding technology proposal by RWTH Aachen University," Joint Video Experts Team (JVET) of ITU-T SG 16 WP 3 and ISO/IEC JTC 1/SC 29/WG 11 , 10th Meeting: San Diego, US, Apr. 10-20, 2018, JVET-J0023-v1 r1,102 pages.

Haitao Yang et al., "CE4 summary report: Inter prediction and motion vector coding", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0024.-r2r3, 62 pages.

Jaeho Lee et al., "CE4-related: Simplified average merge candidate," Joint Video Experts Team (JVET) of ITU-T SG 16 3 WP 3 and ISO/IEC JTC 1/SC 29/WG 11, 12th Meeting: Macau, CN, Oct. 8-12, 2018, Document: JVET-L0144, 3 pages.

Shen Yan-Fei et al., High Efficiency Video Coding, Chinese Journal of Computers, vol. 36, No. 11, with an English Abstract, 16 pages.

ITU-T H.264, Advanced video coding for generic audiovisual services, Series H: Audiovisual and Multimedia Systems Infrastructure of audiovisual services Coding of moving video, Telecommunication Standardization Sector of ITU, Apr. 2017, 812 pages.

Benjamin Bross et al, Versatile Video Coding (Draft 2), JVET-K1001-v6, Editors, Joint Video Experts Team (JVET) of ITU-T SG 16 WP 3 and ISO/IEC JTC 1/SC 29/WG 11, 11th Meeting: Ljubljana, SI, Jul. 10-18, 2018, 139 pages.

Ru-Ling Liao et al, CE10.3.1.b: Triangular prediction unit mode, JVET-L0124-v2, Panasonic corporation, Joint Video Exploration Team (JVET) of ITU-T SG 16 WP 3 and ISO/IEC JTC 1/SC 29/WG 11, 12th Meeting: Macao, CN, Oct. 3 12, 2018, 8 pages.

* cited by examiner

10

APPARATUS AND METHOD FOR INTER PREDICTION OF A TRIANGLE PARTITION OF A CODING BLOCK

CROSS REFERENCE TO RELATED APPLICATIONS

This is a continuation of U.S. patent application Ser. No. 17/225,939, filed on Apr. 8, 2021, which is a continuation of International Patent Application No. PCT/CN2019/109991, filed on Oct. 8, 2019, which claims priority to U.S. Provisional Patent Application No. 62/742,921, filed on Oct. 8, 2018, all of which are hereby incorporated by reference.

TECHNICAL FIELD

Generally, the present invention relates to the field of video coding. More specifically, the present invention relates to apparatuses and methods for encoding and decoding a video coding block of a video signal using triangular partitioning for inter prediction of the video coding block, such as triangular prediction unit, such as triangle merge mode, such as Motion Vector Prediction and Storage for Triangular/Geometric Prediction Units.

BACKGROUND

In current video coding schemes, such as H.264/AVC ("Advanced Video Coding") or HEVC ("High Efficiency Video Coding"), the motion information in inter-predicted pictures (also referred to as frames) is partitioned into rectangular video coding blocks of configurable size. While in H.264/AVC the motion is partitioned into symmetric video coding blocks with a maximum size of 16×16 pixels, so-called macroblocks, which can be further subdivided down to a minimum of 4×4 pixels, HEVC replaces a macroblock with a coding tree unit (CTU) of maximum size 64×64 pixels. The CTU is not just a larger macroblock, as it can be partitioned in a quadtree (QT) decomposition scheme into smaller coding units (CU), which, in turn, can be subdivided down to a minimum size of 8×8 pixels. Furthermore, in comparison to H.264/AVC, additionally HEVC supports asymmetric block partitioning (AMP) of coding units (CU) into prediction units (PU).

The determination of the decomposition and partitioning of each CTU is performed during the encoding process and is based on a rate-distortion optimization criterion. While AMP already provides an improved coding efficiency, problems in coding efficiency may arise along the boundaries of moving objects in a video sequence.

In particular, in cases where object boundaries are not strictly vertical or horizontal, may result in a fine quadtree decomposition and block partitioning along the object boundary. Since the blocks along the boundary are expected to contain similar motion information, redundancy is introduced, which decreases the coding efficiency.

There is a need for video coding devices and methods (i.e. for encoding and/or decoding), which are based on Triangular partitioning or diagonal-based partitioning for inter prediction of a video coding block, which improves the coding efficiency while reducing the memory bandwidth requirements.

SUMMARY

Video coding devices and methods are provided, which are based on triangular partitioning or diagonal based partitioning for inter prediction of a video coding block, so as to improve coding efficiency. The scope of protection is defined by the claims.

The foregoing and other objects are achieved by the subject matter of the independent claims. Further implementation forms are apparent from the dependent claims, the description and the figures.

Embodiments are defined by the features of the independent claims, and further advantageous implementations of the embodiments by the features of the dependent claims.

As used herein, a video signal or video sequence is a set of subsequent frames presenting a motion picture. In other words, a video signal or video sequence consists of a plurality of frames (also referred to as pictures or images).

As used herein, segmentation is the process of partitioning a picture or picture region, in particular a video coding block, into two or more segments or partitions. Here introduce a triangular partition. it splits a CU into two triangular prediction units, in either diagonal or inverse diagonal direction. A CU can be split using two triangular prediction units, in either diagonal or inverse diagonal direction.

As used herein, coding tree unit (CTU) denotes the root of a coding structure of the video sequence of a pre-defined size, containing a part of a frame (e.g. 64×64 pixels). A CTU can be partitioned into several CUs.

As used herein, coding unit (CU) denotes a basic coding structure of the video sequence of a pre-defined size, containing a part of a frame, which is belonging to a CTU. A CU can be partitioned into further CUs.

As used herein, prediction unit (PU) denotes a coding structure, which is the result of partitioning of a CU.

The devices and method described herein may be used for representing motion information for segmentation-based block partitioning, used in conjunction with rectangular block partitioning, which is useful for inter-prediction in video coding applications.

The devices and methods described herein may be used for inter-prediction between pictures to exploit the temporal redundancy of natural video sequences.

In the scenario, a CU can be split using two triangular prediction units, in either diagonal or inverse diagonal direction. Each triangular prediction unit in the CU has its own motion vector and reference frame index or indexes (such as a first reference index, and/or a second reference index) which may be derived from a motion candidate list.

The overall idea of the present disclosure can be summarized as follows: bi-predictive motion vectors are allowed for motion vector storage for at least one 4×4 sub-blocks of the triangular/geometric partition, but only uni-directional motion compensation is performed.

The foregoing and other objects are achieved by the subject matter of the independent claims. Further implementation forms are apparent from the dependent claims, the description and the figures.

According to an aspect of the present disclosure, a method is provided for derivation of motion vectors (MVs), for a coding block (or an image block), comprising the steps of: when the coding block is enabled for a triangle merge mode, generating a merge candidate list for the coding block partitioned into two triangle partitions, wherein the generating of the merge candidate list at least comprises: deriving one or more spatial merge candidates from neighboring coding units; and after deriving the spatial merge candidates, directly or immediately deriving one or more temporal motion vector predictions, MVPs; and deriving uni-prediction MVs as motion vectors of the respective triangle partitions at least based on the merge candidate list.

It can be understood that the expression "coding block" and "image block" can be exchanged throughout the whole application.

In an example, the spatial merge candidates are derived in a similar manner as in HEVC, as illustrated in FIG. 8. The spatial merge candidates are referred to as A0, A1, B0, B1, and B2. A maximum of four merge candidates are selected among the candidates located at the positions depicted in FIG. 8. The order of derivation is A1, B1, B0, A0 and B2. Position B2 is considered only when any CU of position A0, B0, B1, A1 is not available (e.g. because it belongs to another slice or tile) or is intra-coded. After a candidate at position A0 is added to a merge candidate list MCL, the addition of the remaining candidates is subject to a redundancy check which ensures that candidates with the same motion information are excluded from the MCL list, so that the coding efficiency is improved.

Temporal motion vector predictions, MVPs, are derived based on a co-located CU belonging to the collocated reference picture, as shown in FIG. 9 with "6" or "7" being a derived MVP.

The two triangle partitions, e.g. PU0 and PU1, may be the result of partitioning the video coding block along the diagonal or anti-diagonal, as shown in FIG. 6. The blocks PU0 and PU1 may then refer to the lower-left and upper-right triangular part and, respectively, to the upper-left and lower-right triangular part of the video block. The terms video block and video coding block are used synonymously. The terms "triangle partition", "triangle block", "triangular block", and "triangular partition" is used synonymously.

The video coding block may be divided into smaller block units comprising 4×4 pixel blocks. The term pixel may also refer to a sample. Hence, each of the two triangular blocks PU0 and PU1 of the video block may include multiple 4×4 block units, as shown in FIG. 7.

The samples of the 4×4 block units on the diagonal or anti-diagonal of the video block belongs one of the triangle partitions. After predicting each of the triangle partitions (i.e. the triangular blocks), the sample values along the diagonal or anti-diagonal edge are adjusted using a blending processing with adaptive weights. Alternatively, the blending processing may be performed over an extended range around the (anti) diagonal.

According to an aspect of the present disclosure, the uni-prediction MVs are derived based on a uni-prediction MV selection rule for the triangle merge mode and the merge candidate list.

According to an aspect of the present disclosure, the merge candidate list includes one or more uni-prediction MVs and/or one or more bi-prediction MVs.

According to an aspect of the present disclosure, the uni-prediction MV selection rule for the triangle merge mode indicates a first MV or a second MV of a bi-prediction MV of the merge candidate list is selected as a uni-prediction MV.

According to an aspect of the present disclosure, the first MV corresponds to a first reference picture list REF_PIC_LIST0, and the second MV corresponds to a second reference picture list REF_PIC_LIST1.

According to an aspect of the present disclosure, a method is provided for generating a merge candidate list for a coding block, comprising the steps of: when the coding block is enabled for triangle merge mode, generating the merge candidate list for the coding block partitioned into two triangle partitions, wherein the generating of the merge candidate list at least comprises: deriving one or more spatial merge candidates from neighboring coding units; and after deriving the spatial merge candidates, directly or immediately deriving one or more temporal motion vector predictions, MVPs; and adding the one or more spatial merge candidates and the derived one or more temporal MVPs to the merge candidate list, wherein the one or more spatial merge candidates and/or the one or more temporal MVPs comprise uni-prediction MVs or bi-prediction MVs.

Alternatively, after the deriving the spatial merge candidates, at most one temporal motion vector prediction, MVP, may be derived directly and immediately, and at most one of the derived temporal MVP may be added to the merge candidate list. This is exemplified in FIG. 9 through the candidates 6 and 7, respectively.

The position for the temporal candidate is selected between candidates 6 and 7, as depicted in FIG. 9. If the CU at position 6 is not available, it is intra coded, or it is outside of the current row of CTUs, position 7 is used. Otherwise, position 6 is used in the derivation of the temporal MVP (namely the temporal merge candidate).

According to an aspect of the present disclosure, a method is provided for inter prediction of a current triangle partition of a coding block, comprising the steps of: when the coding block is enabled for triangle merge mode, generating a merge candidate list for the coding block, wherein the generating of the merge candidate list at least comprises: deriving one or more spatial merge candidates from neighbouring coding units; and after deriving the spatial merge candidates, directly or immediately deriving one or more temporal motion vector predictions, MVPs; deriving an uni-prediction MV as a motion vector of the current triangle partition at least based on the merge candidate list; and performing prediction of the current triangle partition at least based on the uni-prediction MV, to obtain predicted value of the current triangle partition.

According to an aspect of the present disclosure, the derivation of a sub-block-based temporal merge candidate is excluded from the generating of the merge candidate list.

According to an aspect of the present disclosure, the uni-prediction MV selection rule is any one of the following: if both the first MV from the REF_PIC_LIST0 and the second MV from the REF_PIC_LIST1 relate to a same reference picture, an average motion vector based on the first MV and the second MV is used as the uni-prediction MV; or if a reference picture index of the first MV relates to a reference picture with a temporal distance to a current picture, TD0, smaller than the temporal distance of the second MV to the current picture, TD1, the first MV is used as the uni-prediction MV; or if the second MV from the REF_PIC_LIST1 relates to a reference picture with a temporal distance to the current picture smaller than the temporal distance to the first MV, the second MV is used as the uni-prediction MV; or if the temporal distance to the current picture is equal for both the first MV and the second MV, the first MV from the REF_PIC_LIST0 or the second MV from REF_PIC_LIST1 which has a smaller magnitude is used as the uni-prediction MV.

According to an aspect of the present disclosure, an apparatus is provided for derivation of motion vectors, MVs, for a coding block, comprising: a candidate list generating unit, configured to generate a merge candidate list for the coding block partitioned into two triangle partitions when the coding block is enabled for a triangle merge mode, wherein during the generation of the merge candidate list, one or more spatial merge candidates are derived from neighboring coding units; and after the spatial merge candidates are derived, one or more temporal motion vector predictions, MVPs are directly or immediately derived; and an inter prediction processing unit, configured to derive uni-prediction MVs as motion vectors of the respective triangle partitions at least based on the merge candidate list.

According to an aspect of the present disclosure, an apparatus is provided for generating a merge candidate list for a coding block, comprising: a candidate list generating unit, configured to generate a merge candidate list for the coding block partitioned into two triangle partitions when the coding block is enabled for a triangle merge mode, wherein during the generation of the merge candidate list one or more spatial merge candidates are derived from neighboring coding units; and after the spatial merge candidates are derived, one or more temporal motion vector predictions, MVPs, are directly or immediately derived; and the one or more spatial merge candidates and the derived one or more temporal MVPs are added to the merge candidate list, wherein the one or more spatial merge candidates and/or the one or more temporal MVPs comprise uni-prediction MVs or bi-prediction MVs.

According to an aspect of the present disclosure an apparatus is provided for inter prediction of a current triangle partition of a coding block, comprising: a candidate list generating unit, configured to generate a merge candidate list for the coding block partitioned into two triangle partitions when the coding block is enabled for a triangle merge mode, wherein during the generation of the merge candidate list, one or more spatial merge candidates are derived from neighboring coding units; and after the spatial merge candidates are derived, one or more temporal motion vector predictions, MVPs, are directly or immediately derived; and an inter prediction processing unit, configured to derive uni-prediction MVs as motion vectors of the respective triangle partitions at least based on the merge candidate list and perform prediction of the current triangle partition at least based on the uni-prediction MV, to obtain predicted value of the current triangle partition.

According to an aspect of the present disclosure, the uni-prediction MV selection rule is any one of the following: if both the first MV from the REF_PIC_LIST0 and the second MV from the REF_PIC_LIST1 relate to a same reference picture, an average motion vector based on the first MV and the second MV is used as the uni-prediction MV; or if a reference picture index of the first MV relates to a reference picture with a temporal distance to a current picture, TD0, smaller than the temporal distance of the second MV to the current picture, TD1, the first MV is used as the uni-prediction MV; or if the second MV from the REF_PIC_LIST1 relates to a reference picture with a temporal distance to the current picture smaller than the temporal distance to the first MV, the second MV is used as the uni-prediction MV; or if the temporal distance to the current picture is equal for both the first MV and the second MV, the first MV from the REF_PIC_LIST0 or the second MV from REF_PIC_LIST1 which has a smaller magnitude is used as the uni-prediction MV.

According to an aspect of the present disclosure, a decoding apparatus (200) is provided for decoding a video coding block of a current frame of an encoded video signal, wherein the decoding apparatus (200) comprises: a decoding unit (205, 207) configured to decode the video coding block for providing a residual video coding block; an inter prediction unit (215) configured to: generate a predicted video coding block based on a uni-prediction motion vector, MV, which is derived for a triangle partition of the video coding block for triangle merge mode, wherein bi-prediction motion vectors, MVs, are allowed for motion vector storage for at least one 4×4 sub-block for the triangle merge mode, and perform uni-directional motion compensation; and a reconstruction unit (209) configured to reconstruct the video coding block based on the filtered predicted video coding block and the residual video coding block.

The at least one 4×4 sub-block may be one of the 4×4 sub-blocks located along the (anti)-diagonal line of the current coding block partitioned into two triangle partitions.

According to an aspect of the present disclosure, an apparatus is provided for performing uni-directional motion compensation for triangle merge mode of a coding block, partitioned into two triangle partitions, of a current frame of a video signal, wherein the apparatus comprises: a processing circuitry configured to: derive for each of the two triangle partitions a uni-prediction motion vector, MV, based on a uni-prediction MV selection rule for the triangle merge mode and a merge candidate list; perform motion compensation of each of the two triangle partitions using the corresponding uni-prediction MV; and obtain a predicted coding block based on the two motion compensated triangle partitions.

Using only a uni-directional MV for each of the triangular blocks for the motion compensation may provide an advantage of performing the motion compensation for a triangular-partitioned video coding block efficiently at low computational cost. In other words, the coding efficiency is improved. At the same time, the memory bandwidth for the motion compensation remains to be low. This is because in triangular mode each of the two triangular blocks, in which a video coding block is partitioned, is motion compensated by a uni-directional MV. In other words, the video coding block is motion compensated as if a bi-predictive MV for the video coding block would have been used.

According to an aspect of the present disclosure, wherein the merge candidate list comprises uni-prediction motion vector, MV, candidates and/or bi-prediction motion vector, MV, candidates, wherein a bi-prediction MV candidate includes a first MV and a second MV.

According to an aspect of the present disclosure, the deriving of the uni-prediction MV based on a uni-prediction MV selection rule for the triangle merge mode and a merge candidate list includes: if both the first MV from the REF_PIC_LIST0 and the second MV from the REF_PIC_LIST1 relate to a same reference picture, an average motion vector based on the first MV and the second MV is derived as the uni-prediction MV.

The derivation of the uni-directional MV from a bi-predictive MV by averaging its first and second MV when both MVs refer to the same reference picture may provide an advantage of performing the motion compensation for a triangular block more accurately.

According to an aspect of the present disclosure, the deriving of the uni-prediction MV based on a uni-prediction MV selection rule for the triangle merge mode and a merge candidate list includes: the first MV from the REF_PIC_LIST0 is derived as the uni-prediction MV, if a reference picture index of the first MV relates to a reference picture with a temporal distance to the current picture, TD0, smaller than the temporal distance, TD1, of the second MV to the current picture; or the second MV from the REF_PIC_LIST1 is derived as the uni-prediction MV, if the second MV relates to a reference picture with a temporal distance to the current picture, TD1, smaller than the temporal distance of the first MV.

In an example implementation, a bi-predictive MV from the merge candidate list, from which a uni-prediction MV may be derived, may also be stored. This may provide an advantage of fast access of a bi-prediction MV stored for a particular triangular block, which may be needed for a further post-processing. Hence, the coding efficiency for a triangular block may be improved further via the fast access of the respective bi-predictive MV.

The derivation of a uni-prediction MV from a bi-predictive MV by using one MV with the smallest temporal distance may provide an advantage of performing the motion compensation more accurately. This is because the MV of the bi-prediction MV with the smallest temporal distance has the stronger temporal correlation with the reference picture. Hence, errors in the motion compensation may be minimized further.

According to an aspect of the present disclosure, the deriving of the uni-prediction MV based on a uni-prediction MV selection rule for the triangle merge mode and a merge candidate list includes: the first MV from the REF_PIC_LIST0 or the second MV from REF_PIC_LIST1 with a smaller magnitude is derived as the uni-prediction MV, if a temporal distance of the first MV and the second MV to the current picture is equal.

In one exemplary embodiment, the magnitude "mag" of a MV may be calculated from the sum of the squared components $mv_x$, and $mv_y$ of a two-component motion vector with $$MV=(mv_x, mv_y): mag(MV)=mv_x^2+mv_y^2.$$

Alternatively, the magnitude may be determined according to a metric, such as the p-norm with p>0. When p=2, the p-norm becomes the common Euclidian norm. Other norms suitable to determine the magnitude of a one or multi-component vector, including motion vectors of the present disclosure, may be used.

The derivation of the uni-prediction MV from the bi-prediction MV by using the MV with the smallest magnitude may provide an advantage of performing the motion compensation more accurately in cases when the temporal distance of the first and second MV is the same. This is because, besides the temporal distance of a MV to a reference picture, also the magnitude of a MV is a measure for the deviation of motion information for a current video block. This means that the motion information of a MV with a smaller magnitude may be more suitable for motion compensation of a triangular block, since the motion information differences are smaller than for a MV with a larger magnitude. Thus, the motion compensation may be quite accurate.

In the previous aspects of the present disclosure, a uni-prediction MV may be derived separately by any of the specified rules, depending on whether or not the first and second MV of the bi-prediction MV (i) refer to the same reference picture, (ii) have different temporal distance, and (iii) have a different magnitude.

The derivation of the uni-prediction MV from the bi-prediction MV according to the order of (i) check whether first and second MV refer to same reference picture, (ii) check whose temporal distance is smallest, and finally followed by (iii) check whose magnitude is smallest may provide an advantage of deriving a uni-prediction MV in a gradual manner from the bi-prediction MV according to a hierarchy.

This hierarchy may be determined by the order in which any of the rules (each specified in terms of a "if-conditions, for example") may be tested. Here, said hierarchy may be based on (1) reference picture, (2) temporal distance, and (3) magnitude. Hence, the particular order of (1) to (3) may provide an advantage of deriving a high-quality uni-directional MV from a bi-prediction MV. This means that motion compensation for a triangular block may be performed more accurately by use of such a hierarchically derived MV.

According to an aspect of the present disclosure, the deriving of the uni-prediction MV is based on a uni-prediction MV selection rule for the triangle merge mode and a merge candidate list includes: if both the first MV from the REF_PIC_LIST0 and the second MV from the REF_PIC_LIST1 relate to a same reference picture, an average motion vector based on the first MV and the second MV is derived as the uni-prediction MV; or if a reference picture index of the first MV relates to a reference picture with a temporal distance to the current picture, TD0, smaller than the temporal distance of the second MV to the current picture, TD1, the first MV is derived as the uni-prediction MV; or if the second MV from the REF_PIC_LIST1 relates to a reference picture with a temporal distance to the current picture smaller than the temporal distance to the first MV, the second MV is derived as the uni-prediction MV; or if the temporal distance to the current picture is equal for both the first MV and the second MV, the first MV from the REF_PIC_LIST0 or the second MV from REF_PIC_LIST1 which has a smaller magnitude is derived as the uni-prediction MV candidate.

According to an aspect of the present disclosure, an encoding apparatus (20) is provided for encoding a coding block of a current frame of a video signal, wherein the encoding apparatus (20) comprises: an encoding unit (204, 270) configured to encode the coding block for providing a residual coding block; an inter prediction unit (244) configured to generate a predicted coding block according to previous aspects; and a reconstruction unit (214) configured to reconstruct the coding block based on the predicted coding block and the residual coding block.

According to an aspect of the present disclosure, a decoding apparatus (30) is provided for decoding according block of a current frame of a video signal, wherein the decoding apparatus (30) comprises: a decoding unit (304) configured to decode the coding block for providing a residual coding block; an inter prediction unit (344) configured to generate a predicted coding block; and a reconstruction unit (314) configured to reconstruct the coding block based on the predicted coding block and the residual coding block.

According to an aspect of the present disclosure, an encoder is provided comprising a processing circuitry for carrying out the method according to any one of the previous aspects of the present disclosure.

According to an aspect of the present disclosure, a decoder is provided comprising processing circuitry for carrying out the method according to any one of the previous aspects of the present disclosure.

According to an aspect of the present disclosure, a computer program product is provided comprising a program code for performing the method according to any one of the previous aspects of the present disclosure.

According to an aspect of the present disclosure, a decoder is provided, comprising: one or more processors; and a non-transitory computer-readable storage medium coupled to the processors and storing programming for execution by the processors, wherein the programming, when executed by the processors, configures the decoder to carry out the method according to any one of the previous aspects of the present disclosure.

According to an aspect of the present disclosure, an encoder is provided, comprising: one or more processors;

and a non-transitory computer-readable storage medium coupled to the processors and storing programming for execution by the processors, wherein the programming, when executed by the processors, configures the encoder to carry out the method according to any one of the previous aspects of the present disclosure.

The decoder(s) and encoder(s) according to any of the previous aspects of the present disclosure may provide an advantage of video encoding and decoding more accurately without increase of computational complexity and storage demand. This applies in particular for the inter-prediction, employing the derivation of a uni-prediction MV according to any of the previous aspects of the present disclosure.

The method for performing motion compensation using uni-directional MV derived from a bi-predictive MV according to any of the previous aspects of the present disclosure related to method steps may provide the same advantage(s) as their corresponding aspects related to the apparatus.

According to an aspect the invention relates to an apparatus for decoding a video stream includes a processor and a memory. The memory is storing instructions that cause the processor to perform the method according to any one of the preceding method aspects.

According to an aspect the invention relates to an apparatus for encoding a video stream includes a processor and a memory. The memory is storing instructions that cause the processor to perform the method according to any one of the preceding method aspects.

According to an aspect, a computer-readable storage medium having stored thereon instructions that when executed cause one or more processors configured to code video data is proposed. The instructions cause the one or more processors to perform a method according to any one of the preceding aspects or any possible embodiment of any one of the preceding aspects.

According to an aspect, the invention relates to a computer program comprising program code for performing the method according to any one of the preceding aspects or any possible embodiment of any one of the preceding aspects when executed on a computer.

Details of one or more embodiments are set forth in the accompanying drawings and the description below. Other features, objects, and advantages will be apparent from the description, drawings, and claims.

The invention can be implemented in hardware and/or software.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

Further embodiments will be described with respect to the following figures. The same reference number represents the same element on all drawings. It should be understood that the drawings are not necessarily to scale. In the various figures, identical reference signs will be used for identical or at least functionally equivalent features.

DETAILED DESCRIPTION OF THE EMBODIMENTS

Figure 1A:
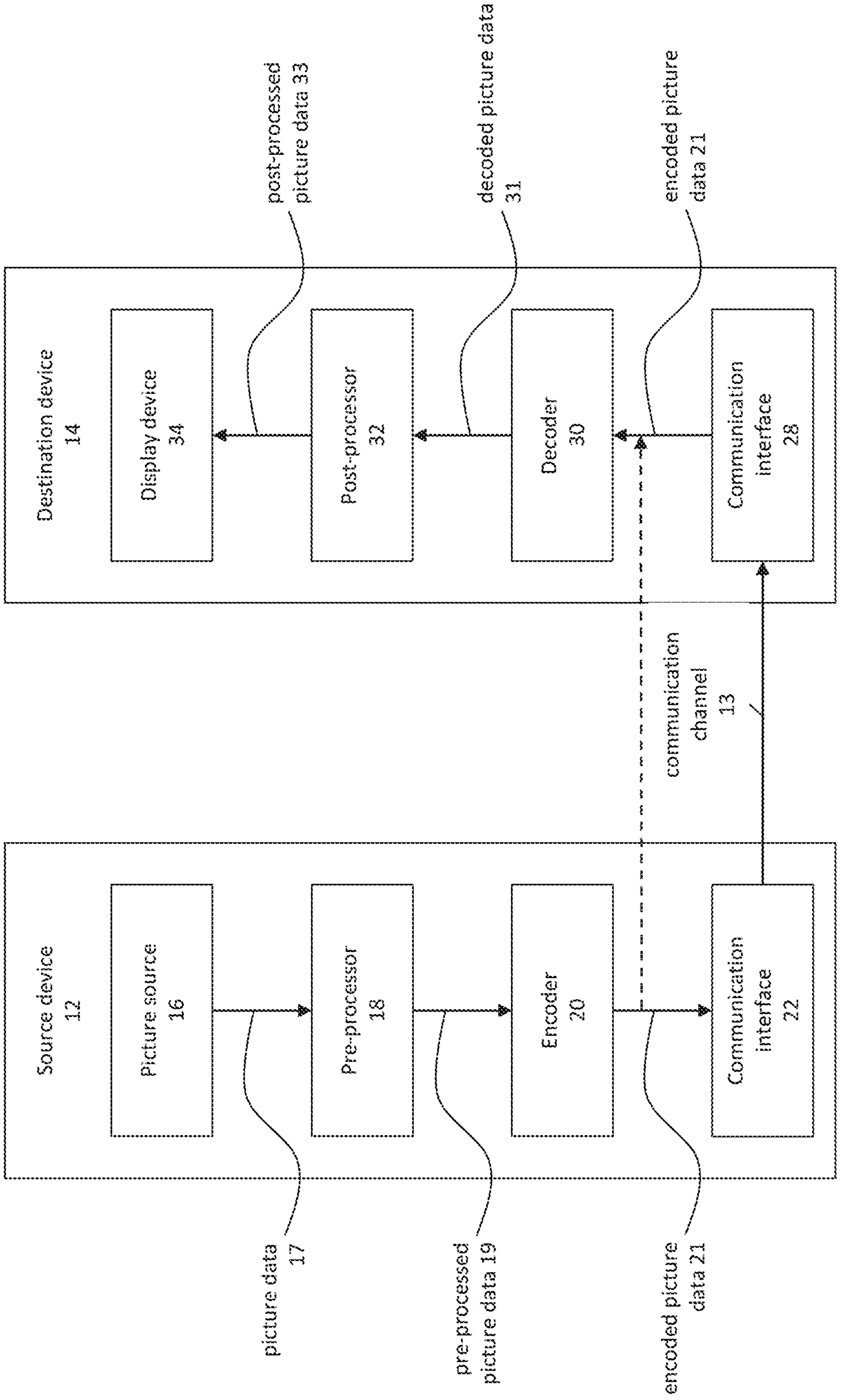
FIG. 1A is a block diagram showing an example of a video coding system according to an embodiment.

In order to describe the invention in detail, the following terms, abbreviations, and notations will be used:

HEVC High-Efficiency Video Coding
CU Coding Unit
CTU Coding Tree Unit
PU Prediction Unit
PB Prediction Block
MV Motion Vector
POC Picture Order Count In the following description, reference is made to the accompanying drawings, which form part of the disclosure, and in which are shown, by way of illustration, specific aspects of example embodiments. It is understood that other aspects may be utilized and structural or logical changes may be made without departing from the scope of the present description and claims. The following detailed description, therefore, is not to be taken in a limiting sense, as the scope is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts, i.e. video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 21.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
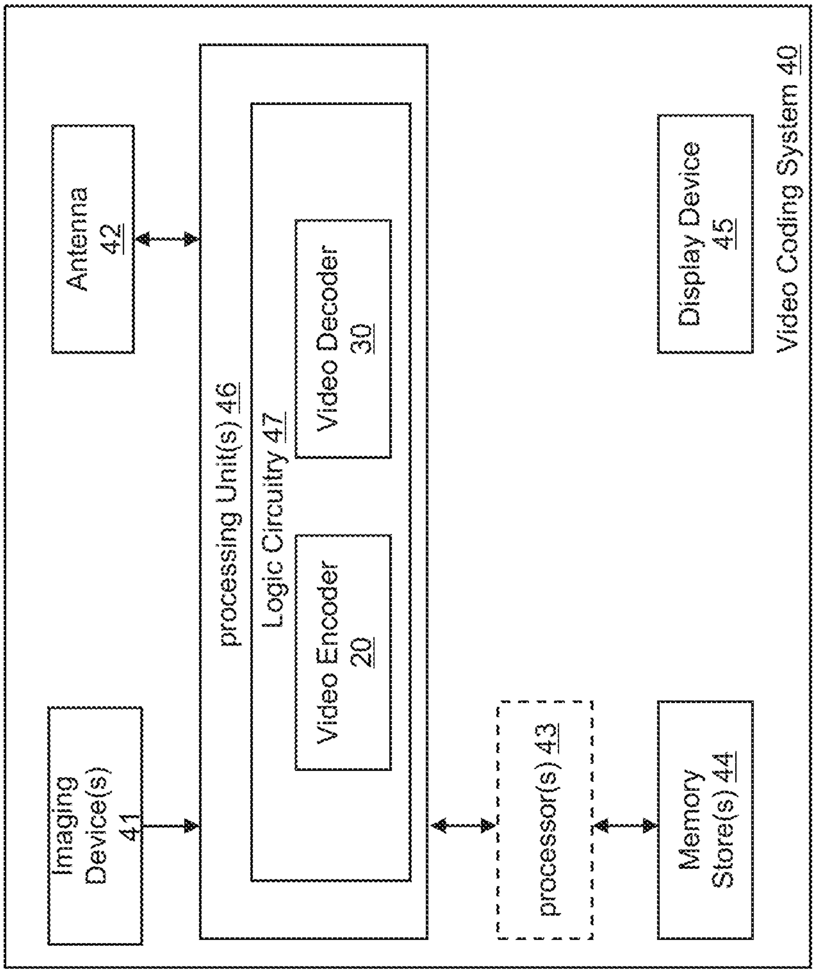
FIG. 1B is a block diagram showing another example of a video coding system according to an embodiment.

The encoder 20 (e.g. a video encoder 20) and the decoder 30 (e.g. a video decoder 30) each may be implemented as any of a variety of suitable circuitry as shown in FIG. 1B, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 2:
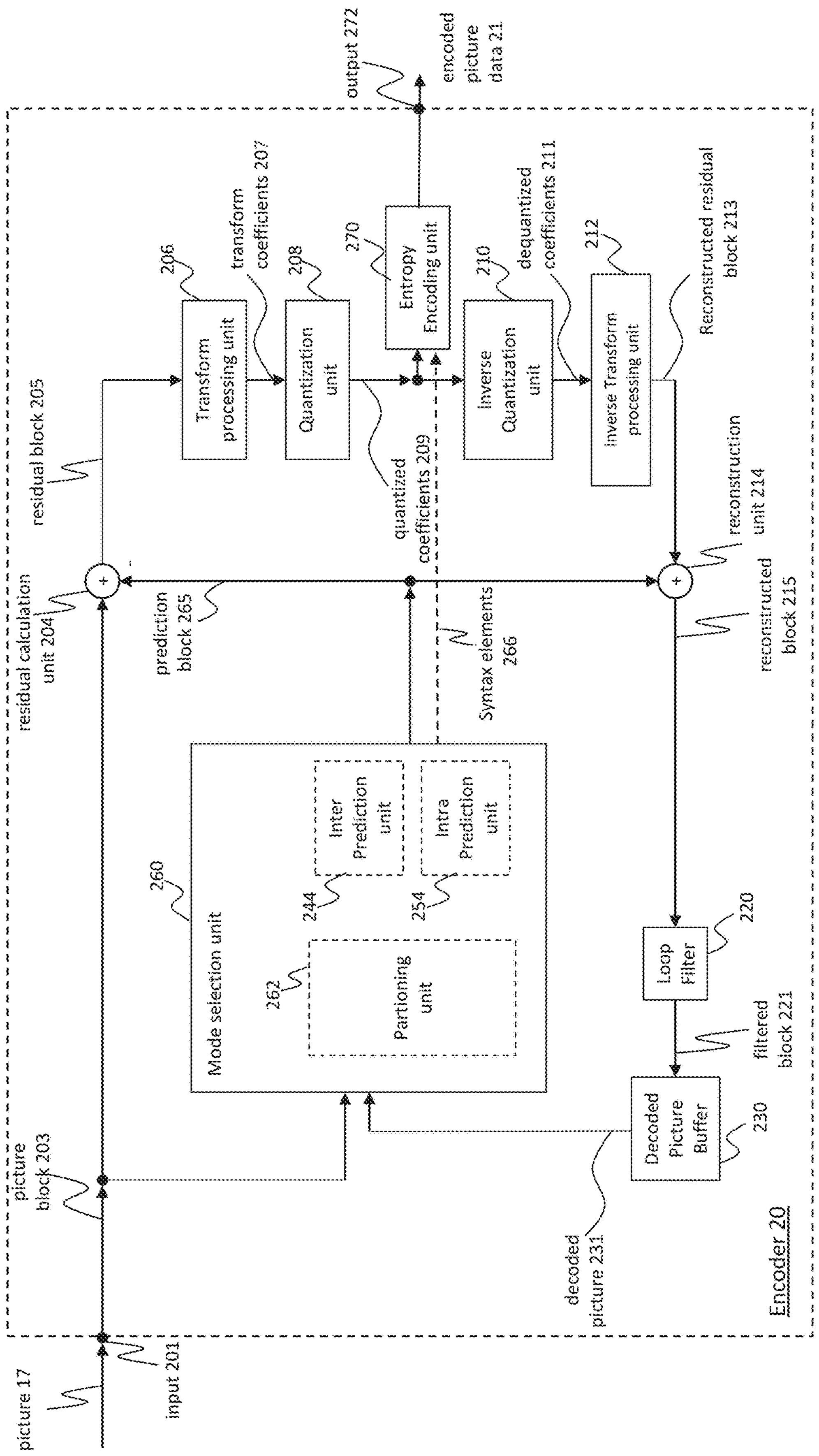
FIG. 2 is a block diagram showing an example of a video encoder according to an embodiment.
Figure 3:
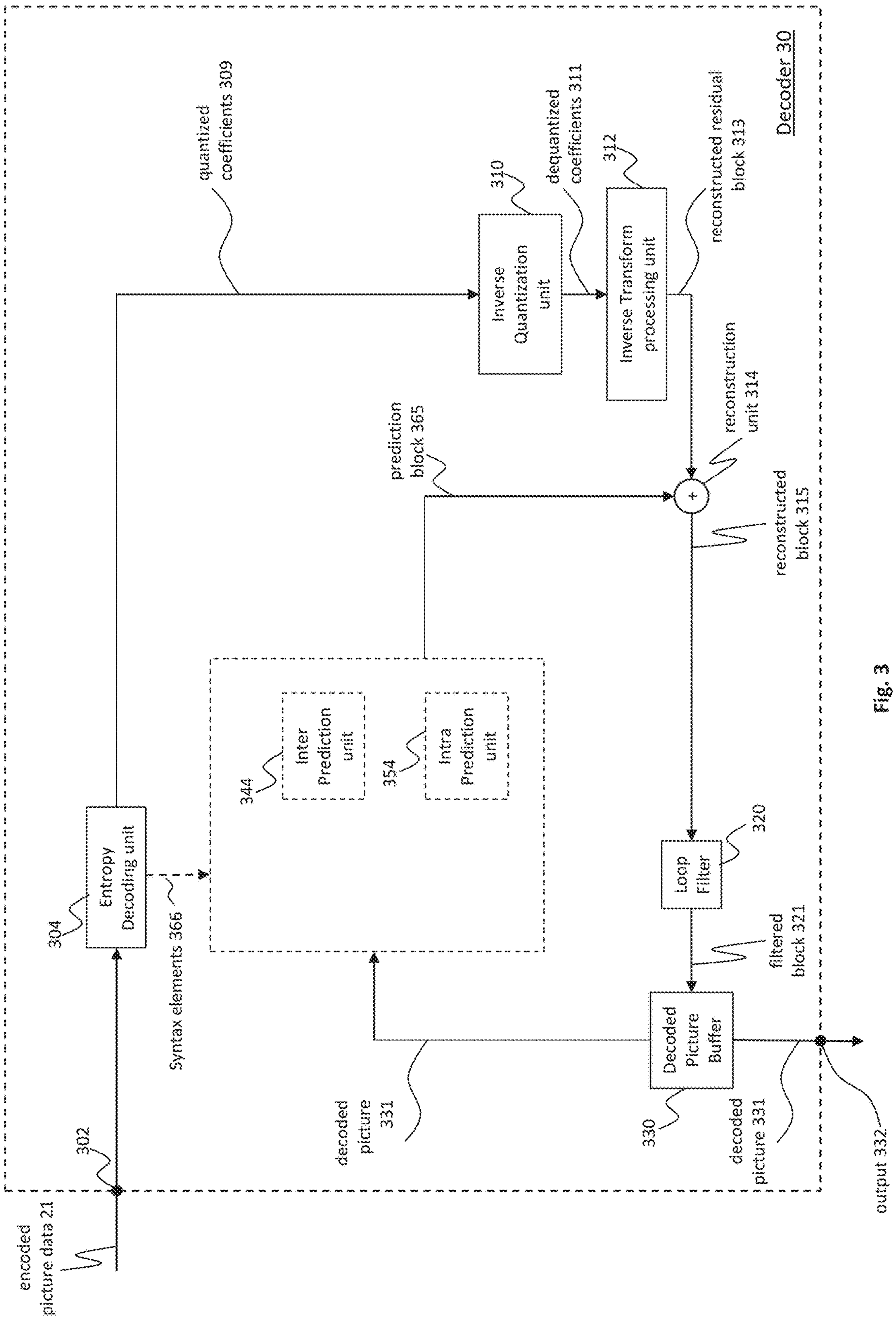
FIG. 3 is a block diagram showing an example structure of a video decoder according to an embodiment.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 20 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 20 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, an inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures and Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC), coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture), three sample arrays (e.g. a luma and two chroma arrays in case of a color picture 17), or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints, like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magneto-resistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
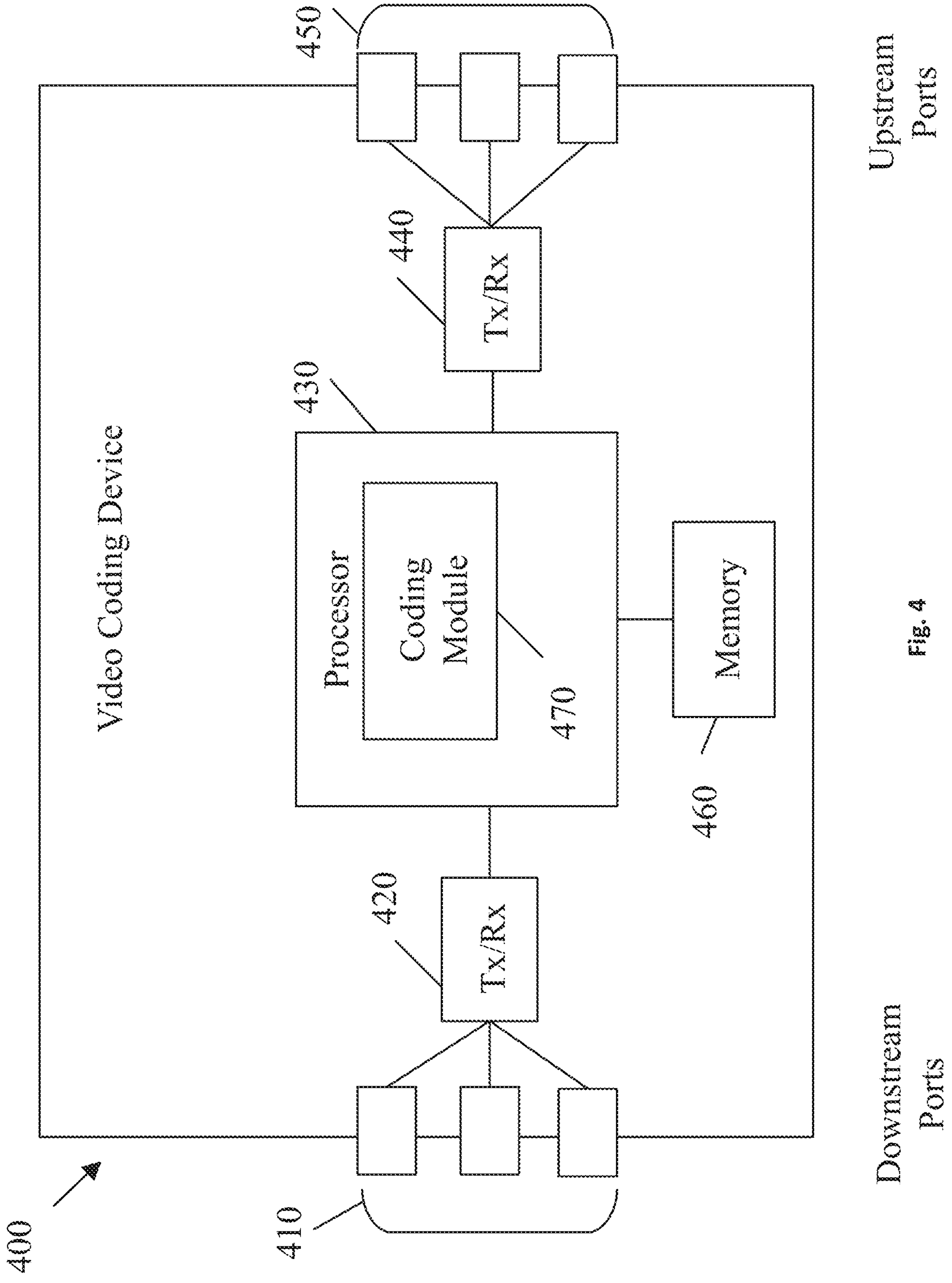
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICS, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
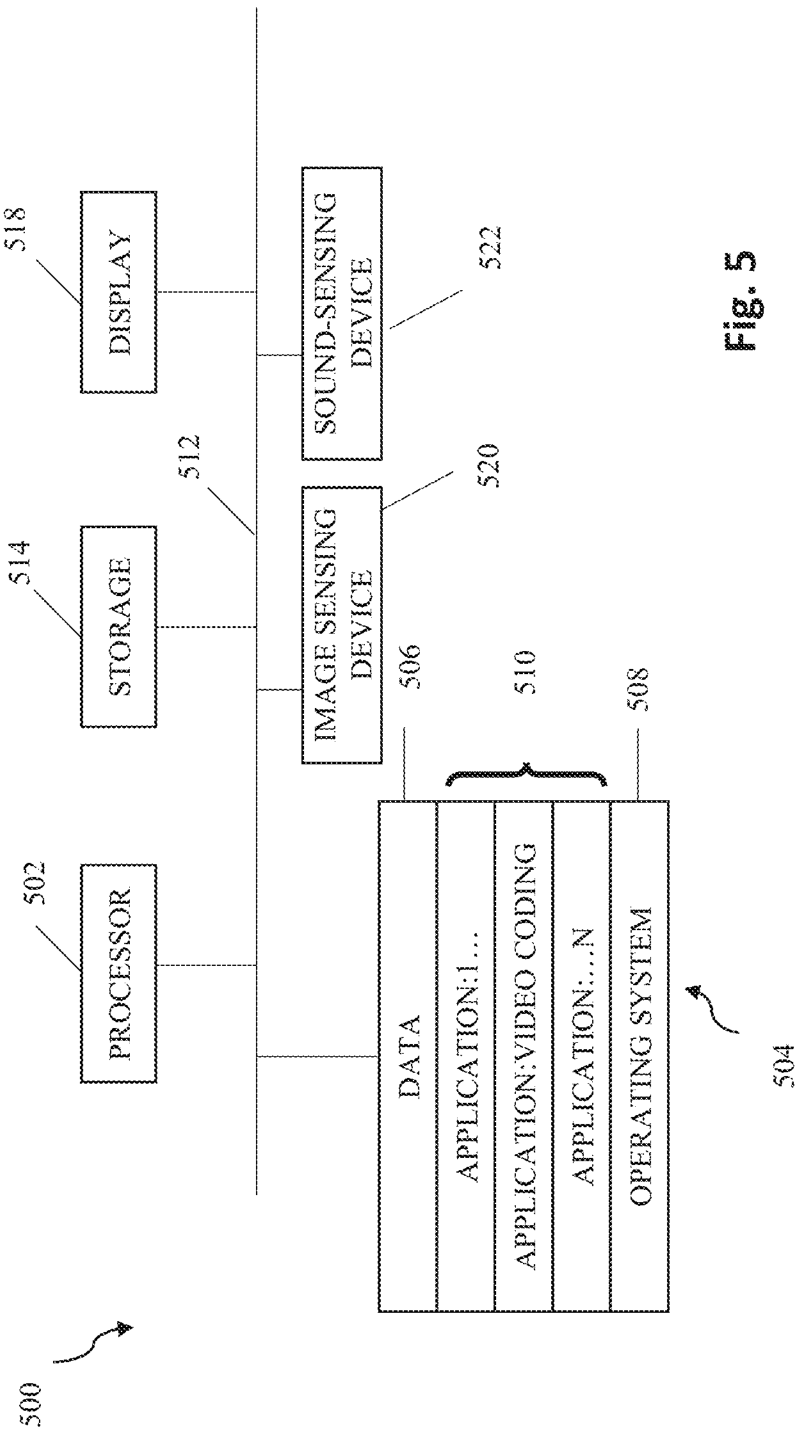
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In the embodiment shown in FIG. 2, the encoding apparatus 20 (or the encoder 20) comprises a partitioning unit 262 configured to partition the video coding block into two or more Triangular segments including a first Triangular segment and a second Triangular segment.

Furthermore, the encoding apparatus 20 comprises an inter prediction unit 244. the decoding apparatus 30 comprises an inter prediction unit 344. Generally, the inter prediction unit 244 can be configured to perform motion estimation, motion compensation for choosing motion data including a selected reference picture, motion vector, mode decision and other information. Generally, the inter prediction unit 344 can be configured to perform motion compensation. In one example, each triangular prediction unit in the CU has its own uni-prediction or bi-prediction motion vector and reference frame index or indexes which are derived from a motion candidate list. In one example, Triangular partitioning is only applied to motion compensated prediction, which means that the transform and quantization process is applied to the whole CU formed by combining the two triangles together. The details will be described later.

In the following, details on the triangular partitioning and the derivation of a uni-prediction motion vector from a bi-prediction motion vector. The result is to obtain a predicted coding block (including motion compensation) from two triangular blocks of the image block.

It is known that triangular/geometric block partitioning can have a larger impact on memory bandwidth requirements when performing motion compensation. Typically, a motion vector associated with a triangular/geometric partition (called PU0 or PU1, see FIG. 6) is used to fetch a rectangular block of samples from the reference picture in the same manner as it is performed for the usual, inter-predicted blocks in state-of-the-art video coding. Then, typically by means of a per-sample mask associated with the rectangular block, only the samples that relate to the current triangular/geometric partition are retained and those outside of the current triangular/geometric partition are discarded. In consequence, if both triangular/geometric partitions are using bi-prediction, four motion compensation steps would need to be performed.

It is therefore asserted that triangular/geometric partitions shall be restricted to perform uni-prediction only. This means that a video coding block is handled as if the whole block was predicted in a bi-predictive manner. This restriction not only decreases the coding efficiency of a triangular/geometric inter prediction mode but may also have adverse effects for spatially or temporally neighboring blocks that use the motion information of the triangular partitions for prediction.

The following embodiments, provide method(s) and apparatus(es) for deriving motion vectors and/or for generating a merge candidate list and/or performing inter-prediction and/or motion compensation for a triangular block using uni-prediction motion vectors for triangle merge mode, where a video coding block is partitioned into two triangle blocks/partitions.

Figure 6:
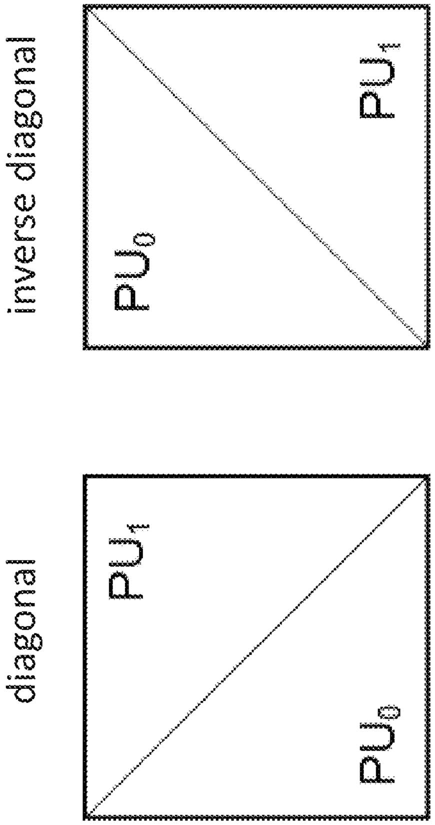
FIG. 6 shows a schematic diagram illustrating triangular block partitioning for inter-picture prediction.

FIG. 6 shows an example of a square video coding block intended for inter-prediction. Alternatively, the video block may be rectangular. The video block is divided into two triangular blocks, e.g. PU0 and PU1, as result of partitioning the video coding block along the diagonal or anti-diagonal, as shown in FIG. 6. The blocks PU0 and PU1 may then refer to the lower-left and upper-right triangular part and, respectively, to the upper-left and lower-right triangular part of the video block. The terms video block and video coding block are used synonymously.

The generation of the candidate list, may be performed according to known techniques from the prior art or new way, and discussed further below.

Figure 7:
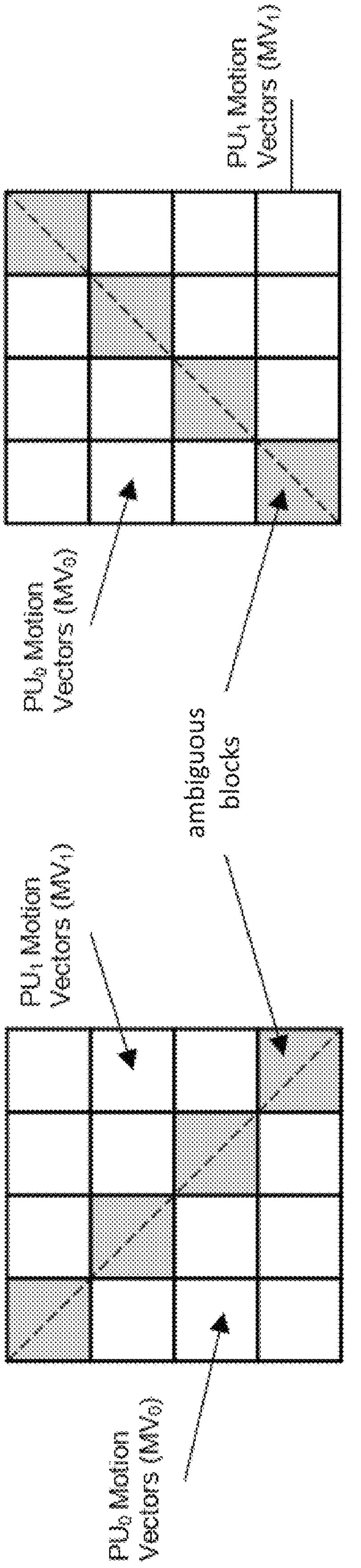
FIG. 7 shows a schematic diagram illustrating motion vector storage ambiguity for triangular partitions.

The motion vectors, associated with the triangular partitions, may be stored on a 4×4 luma-sample based grid for future referencing. Here, the ambiguity problem shown in FIG. 7 arises: the 4×4 blocks (i.e. the 4×4 pixel/sample blocks) that are sliced by the diagonals can be either associated with PU0 or PU1. However, in order to store a motion vector, the decoder needs to be able to uniquely decide, which motion vectors are stored at which positions on the 4×4 grid.

Figure 8:
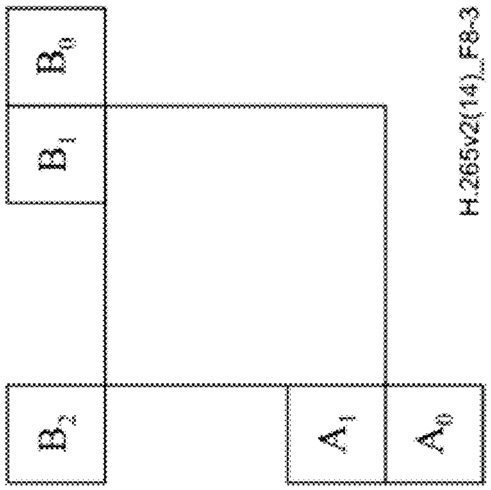
FIG. 8 shows a schematic diagram illustrating spatial positions checked for merge list derivation.

In the current VTM/BMS software, uni-prediction restriction for merge mode is achieved in the following way (following JVET-K1001. JVET-K1001: first, the candidate list generation process is invoked as specified in Section 8.3.2.2 of JVET-K1001:

1. Spatial MV candidates are derived
2. Sub-block based temporal MV candidates are derived
3. Temporal MV candidates are derived The resulting intermediate order of candidates is $A_1$, $B_1$, $B_0$, $A_0$, SbCol, $B_2$, Col is shown in FIG. 8.

Two more steps are performed to finish the merge candidate list generation:

4. Combined bi-predictive candidates are derived
5. Zero motion vectors are added to fill the list After the merge list generation, it is checked whether uni-prediction restriction is applied to the current block. This is always true for the case of triangular/geometric inter prediction. Then, the uni-prediction restriction is applied by scanning the entire merge list and invalidating the REF_PIC_LIST1 motion vector in the following way:

```
if ( PU::isBipredRestriction( pu ) )
{
  for ( uint32_tmergeCand = 0; mergeCand < mergeCtx.num ValidMergeCand;
++mergeCand )
  {
    if ( mergeCtx.interDirNeighbours[ mergeCand ] == 3 )
    {
      mergeCtx.interDirNeighbours[ mergeCand ] = 1;
      mergeCtx.mvFieldNeighbours[( mergeCand << 1 ) + 1].setMvField(Mv( 0,0 ), −1);
    }
  }
}
```

Figure 9:
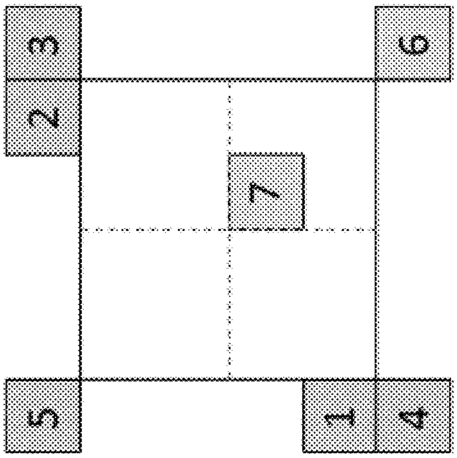
FIG. 9 shows a schematic diagram illustrating spatial and temporal MV positions as specified in JVET-L0124 for triangular partitions.

It is noted that JVET-L0124 uses a different way of generating the merge list candidates. Here, a uni-prediction merge list is generated using candidates as shown in FIG. 9.

Figure 10:
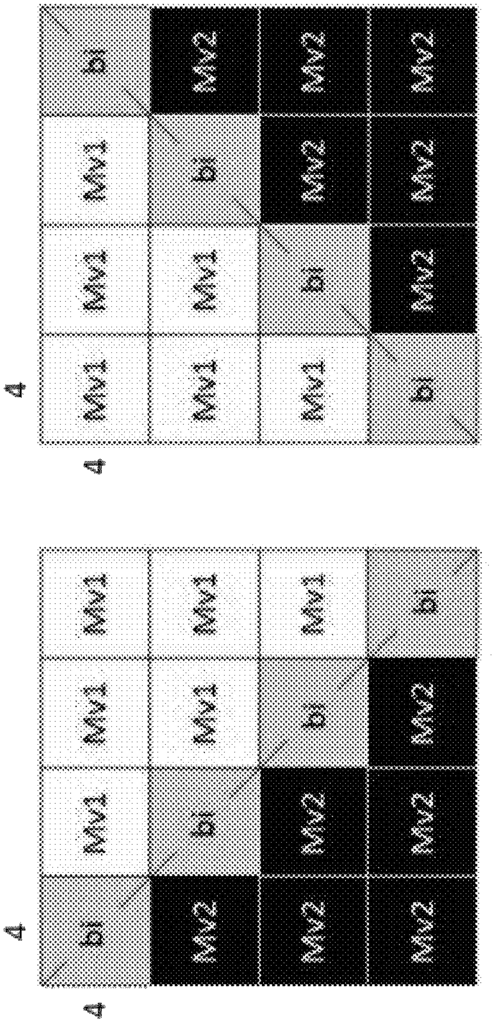
FIG. 10 shows a schematic diagram illustrating motion vector storage as proposed in JVET-L0124 for triangular partitions.

Then, for motion vector storage, depending on the location of each 4×4 block within the current block, either a uni-prediction MV or a bi-prediction MV is stored as shown in FIG. 10.

Although bi-prediction candidates are stored on the diagonals in this manner, they are only made available for very few neighboring locations. Further, it is noted that the motion vectors indicated as “bi” are some sort of combination of Mv1 and Mv2.

Typically, a uni-prediction restriction is enforced for small rectangular blocks (≤8×8 luma samples). If however, a uni-prediction restriction is enforced for larger blocks, such as triangular partitioned blocks, it is believed that this may decrease the coding efficiency of neighboring blocks, which reference the uni-prediction motion vector. It would be beneficial if those neighboring blocks could also reference bi-prediction motion vectors.

Bi-predictive motion vectors are allowed for motion vector storage for at least one 4×4 sub-blocks (such as 4×4 sub-blocks which are located along the direction of the triangle partition (diagonal or anti-diagonal), or all 4×4 sub-blocks) of the triangular/geometric partition, but only uni-directional motion compensation is performed.

It is proposed not to apply the process of restricting bi-prediction merge candidates as described above for triangular partitions. It is rather suggested to perform the merge candidate list, MCL, generation in the same manner as specified in JVET-K1001 (prior-art, likely to change in the development of VVC), with the exception of not generating sub-block based MV candidates.

According to a first embodiment, a method is provided for derivation of motion vectors, MVs, for a coding block, comprising the steps of: when the coding block is enabled for a triangle merge mode, generating a merge candidate list for the coding block partitioned into two triangle partitions, wherein the generating of the merge candidate list at least comprises: deriving one or more spatial merge candidates from neighboring coding units; and after deriving the spatial merge candidates, directly or immediately deriving one or more temporal motion vector predictions, MVPs; and deriving uni-prediction MVs as motion vectors of the respective triangle partitions at least based on the merge candidate list.

According to an embodiment, the uni-prediction MVs are derived based on a uni-prediction MV selection rule for the triangle merge mode and the merge candidate list.

According to an embodiment, the merge candidate list includes one or more uni-prediction MVs and/or one or more bi-prediction MVs.

According to an embodiment, the uni-prediction MV selection rule for the triangle merge mode indicates a first MV or a second MV of a bi-prediction MV of the merge candidate list is selected as a uni-prediction MV.

According to an embodiment, the first MV is corresponding to a first reference picture list, REF_PIC_LIST0, and the second MV is corresponding to a second reference picture list, REF_PIC_LIST1.

Figure 11:
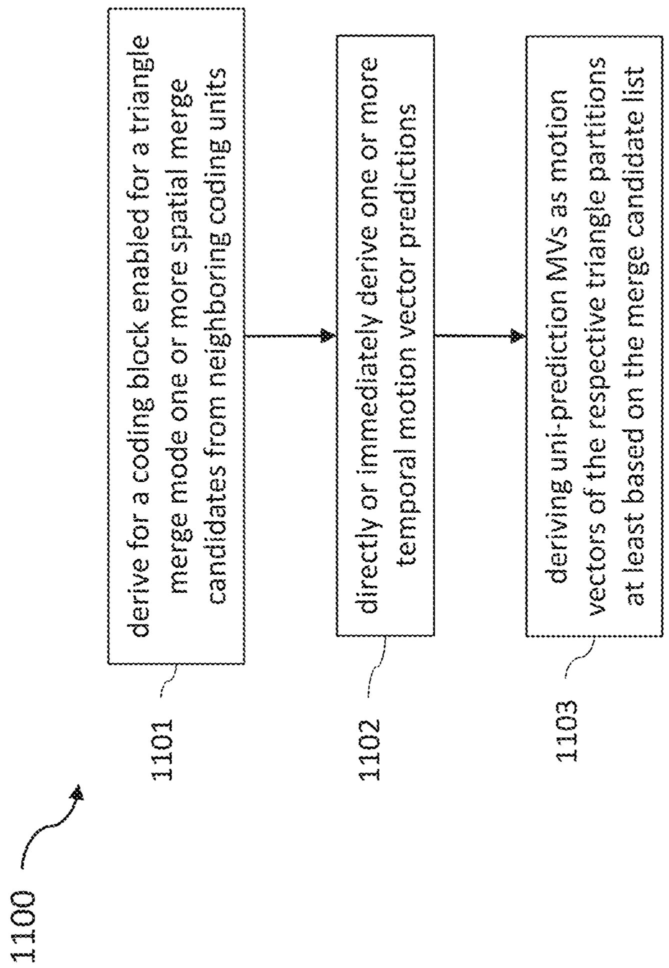
FIG. 11 shows a flowchart of the method for motion vector derivation.

FIG. 11 shows a flowchart of the MV derivation. In step 1101, for a coding block enabled for a triangle merge mode one or more spatial merge candidates are derived from neighboring coding units. In step 1102, one or more temporal motion vector predictions are directly or immediately derived. In step 1103, uni-prediction MVs as motion vectors of the respective triangle partitions are derived at least based on the merge candidate list.

According to a second embodiment, a method is provided for generating a merge candidate list for a coding block, comprising the steps of: when the coding block is enabled for triangle merge mode, generating the merge candidate list for the coding block partitioned into two triangle partitions, wherein the generating of the merge candidate list at least comprises: deriving one or more spatial merge candidates from neighboring coding units; and after deriving the spatial merge candidates, directly or immediately deriving one or more temporal motion vector predictions, MVPs; and adding the one or more spatial merge candidates and the derived one or more temporal MVPs to the merge candidate list, wherein the one or more spatial merge candidates and/or the one or more temporal MVPs comprise uni-prediction MVs or bi-prediction MVs.

Figure 12:
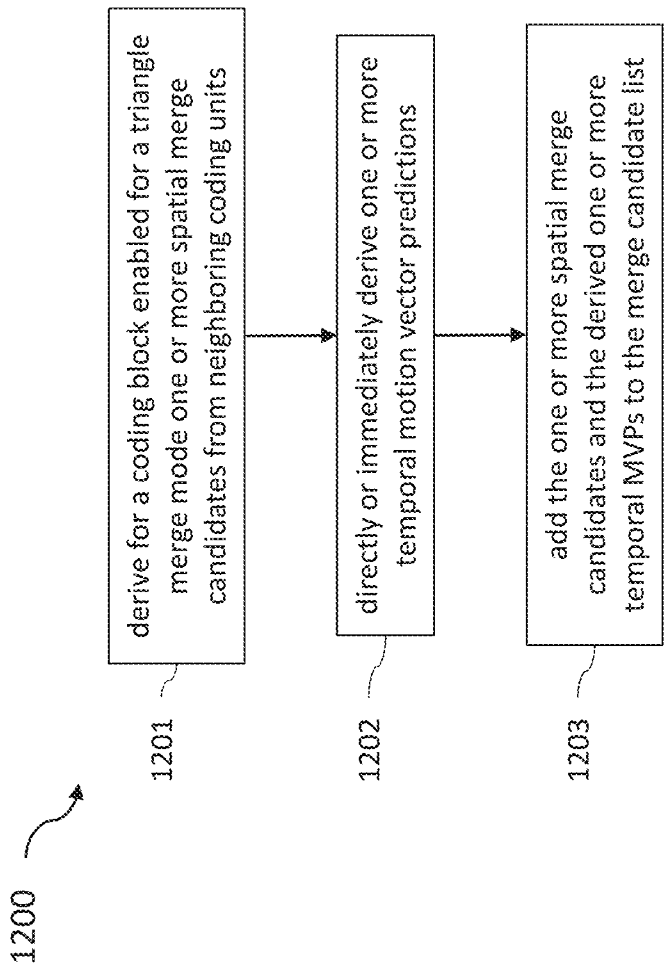
FIG. 12 shows a flowchart of the method for merge candidate list generation.

FIG. 12 shows a flowchart of the merge candidate list generation. In step 1201, for a coding block enabled for a triangle merge mode one or more spatial merge candidates are derived from neighboring coding units. In step 1202, one or more temporal motion vector predictions are directly or immediately derived. In step 1203, the one or more spatial merge candidates and the derived one or more temporal MVPs are added to the merge candidate list.

According to a third embodiment, a method is provided for inter prediction of a current triangle partition of a coding block, comprising the steps of: when the coding block is enabled for triangle merge mode, generating a merge candidate list for the coding block, wherein the generating of the merge candidate list at least comprises: deriving one or more spatial merge candidates from neighbouring coding units; and after deriving the spatial merge candidates, directly or immediately deriving one or more temporal motion vector predictions, MVPs; deriving an uni-prediction MV as a motion vector of the current triangle partition at least based on the merge candidate list; and performing prediction of the current triangle partition at least based on the uni-prediction MV, to obtain predicted value of the current triangle partition.

Figure 13:
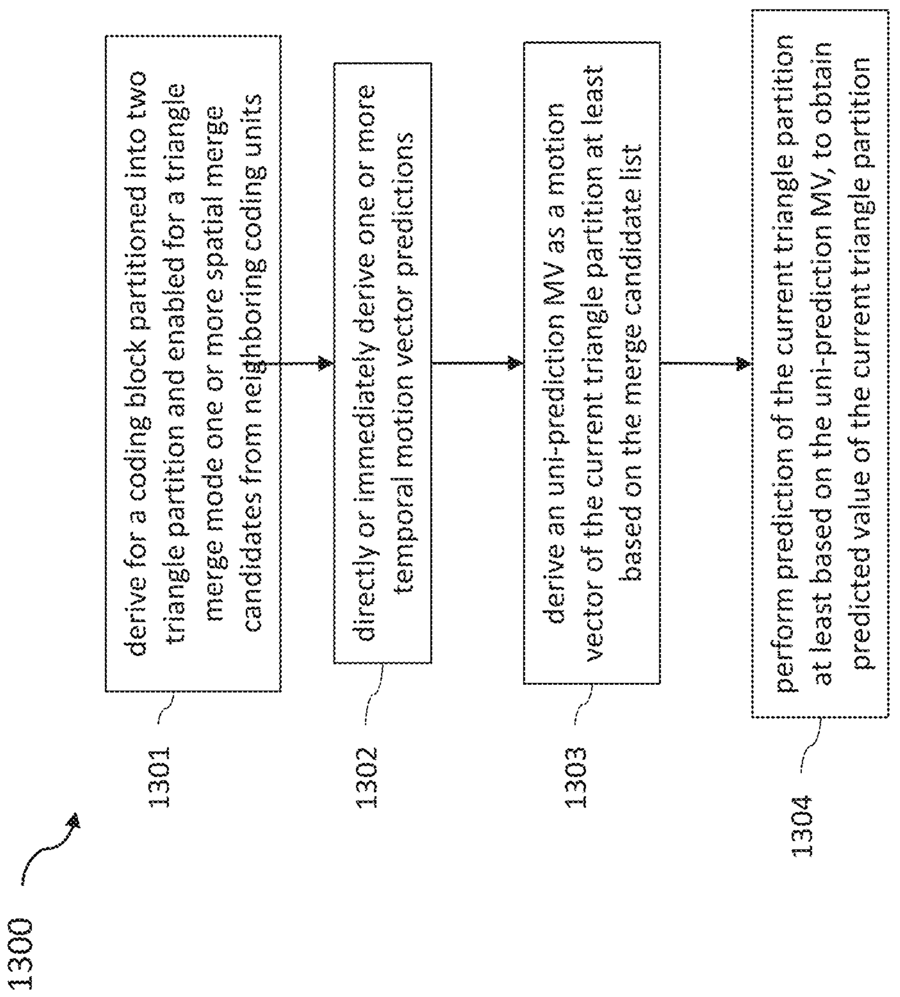
FIG. 13 shows a flowchart of the method for inter-prediction.

FIG. 13 shows a flowchart of the merge candidate list generation. In step 1301, for a coding block partitioned into two triangle partition and enabled for a triangle merge mode one or more spatial merge candidates are derived from neighboring coding units. In step 1302, one or more temporal motion vector predictions are directly or immediately derived. In step 1303, an uni-prediction MV is derived as a motion vector of the current triangle partition at least based on the merge candidate list. In step 1304, prediction of the current triangle partition is performed at least based on the uni-prediction MV, to obtain predicted value of the current triangle partition.

According to an embodiment, the derivation of a sub-block-based temporal merge candidate is excluded from the generating of the merge candidate list.

According to an embodiment, the uni-prediction MV selection rule is any one of the following: if both the first MV from the REF_PIC_LIST0 and the second MV from the REF_PIC_LIST1 relate to a same reference picture, an average motion vector based on the first MV and the second MV is used as the uni-prediction MV; or if a reference picture index of the first MV relates to a reference picture with a temporal distance to a current picture, TD0, smaller than the temporal distance of the second MV to the current picture, TD1, the first MV is used as the uni-prediction MV; or if the second MV from the REF_PIC_LIST1 relates to a reference picture with a temporal distance to the current picture smaller than the temporal distance to the first MV, the second MV is used as the uni-prediction MV; or if the temporal distance to the current picture is equal for both the first MV and the second MV, the first MV from the REF_PIC_LIST0 or the second MV from REF_PIC_LIST1 which has a smaller magnitude is used as the uni-prediction MV.

For completeness, the order of derivation is the following:

1. Spatial MV candidates are derived
2. Temporal MV candidates are derived
3. Combined bi-predictive candidates are derived
4. Zero motion vectors are added to fill the list Thus, the resulting merge candidate list can be composed of uni-prediction or bi-prediction candidates. It is noted that the process of merge list generation can also be different from the process specified above.

Figure 14:
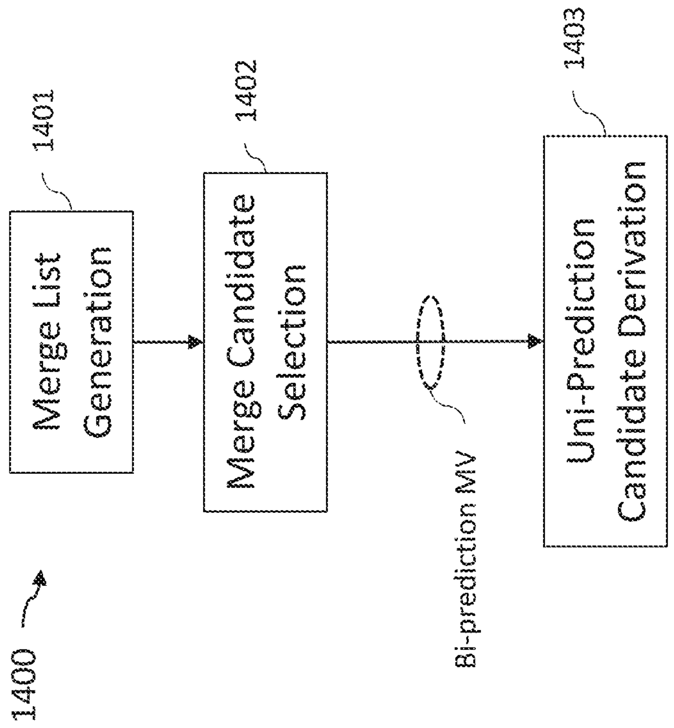
FIG. 14 shows a flowchart with combined steps of merge list generation, merge candidate selection, and uni-prediction MV derivation.

FIG. 14 shows an overall flowchart including the methods of the previous embodiments. In step 1401, a merge candidate list is generated according to the previous embodiment. In step 1402, a merge candidate is selected from the merge candidate list. The selected candidate may be a bi-prediction candidate. From the bi-prediction candidate, a uni-prediction candidate is derived in step 1403.

Note that these steps relate to the encoder as well as the decoder of a video codec.

Uni-Prediction Candidate Derivation

If a bi-prediction candidate is now signaled for the current triangular or geometric partition by means of a merge index and from the previously generated merge list, the uni-prediction candidate derivation process is invoked.

Input to the process is a bi-prediction motion vector, which actually means that two motion vectors are present, which can relate to two different reference pictures. In the following, the terminology from HEVC/JEM/VVC is used. The first motion vector may relate to a reference picture from the first reference picture list that is named REF_PIC_LIST0 and the second motion vector may relate to a second reference picture from a second reference picture list that is named REF_PIC_LIST1.

As both reference picture lists can contain multiple reference pictures, a reference picture index (refPicIdx0 and refPicIdx1) is used to select a reference picture. The output of the process is a single motion vector and a reference picture index, such that a uni-directional motion compensation can be performed for the current triangular prediction unit.

The various ways, in which the uni-directional MV may be derived from a selected bi-predictive MV, is summarized as follows:

1. A uni-directional motion vector is derived from the first (REF_PIC_LIST0) and second (REF_PIC_LIST1) motion vector according to the following criterions:
   a. If both the REF_PIC_LIST0 and the REF_PIC_LIST1 motion vector relate to the same reference picture, calculate an average motion vector.
   b. Otherwise if the reference picture index of the REF_PIC_LIST0 motion vector relates to a reference picture with a smaller temporal distance (POC distance in HEVC) to the current picture than the REF_PIC_LIST1 motion vector, use the REF_PIC_LIST0 motion vector.
   c. Otherwise, if the REF_PIC_LIST1 motion vector relates to a reference picture with a temporal distance to the current picture smaller than the temporal distance to the REF_PIC_LIST0 motion vector, use the REF_PIC_LIST1 motion vector.
   d. Otherwise if the temporal distance to the current picture is equal for both REF_PIC_LIST0 and REF_PIC_LIST1 motion vectors, use the motion vector which has a smaller magnitude. The magnitude can be inferred from the x- and y-components of each motion vector according to Equation (1):

$$\mathrm{mag}(MV) = mv_x^2 + mv_y^2 \tag{1}$$

2. It is signaled, which motion vector (REF_PIC_LIST0 or REF_PIC_LIST1) of the bi-prediction candidate is used by an additional flag, called refpiclist_indicator_flag. If the flag is zero, the REF_PIC_LIST0 vector is used. Otherwise, the REF_PIC_LIST1 vector is used.

The additional flag is coded after the merge index (merge_triangle_idx) is coded, if and only if the merge candidate is a bi-prediction candidate (determined by mergeCandidateIsBi) and if the block width+block height is larger than a pre-determined threshold cbBiSizeLimit. This signaling can be performed in the following exemplified way (prior-art according to JVET-L0124, new additions are marked in yellow).

In the above example, the magnitude "mag" of a MV is calculated from the sum of the squared components $mv_x$ and $mv_y$ of a two-component motion vector with $MV=(mv_x, mv_y)$, as shown by Eq. (1).

Alternatively, the magnitude may be determined according to a metric, such as the p-norm with p>0. When p=2, the p-norm becomes the common Euclidian norm. Other norms suitable to determine the magnitude of a one or multi-component vector, including motion vectors of the present disclosure, may be used.

An example for a coding unit syntax is provided by the code excerpt below.

| | Descriptor |
|---|---|
| coding_unit( x0, y0, cbWidth, cbHeight, treeType ) { | |
| ... | |
| } else {/* MODE_INTER */ | |
| If( cu_skip_flag[x0][y0]) { | |
| If( sps_affine_enabled_flag && cbWidth >= 8 && cbHeight >= 8 && | |
| (MotionModelIdc[x0−1][y0+cbHeight−1] != 0 \|\| | |
| MotionModelIdc[x0−1][y0+cbHeight] != 0 \|\| | |
| MotionModelIdc[x0−1][y0−1] != 0 \|\| | |
| MotionModelIdc[x0+cbWidth−1][y0−1] != 0 \|\| | |
| MotionModelIdc[x0+cbWidth][y0−1]] != 0 ) ) | |
| merge_affine_flag[x0][y0] | ae(v) |
| If(slice_type == B && sps_triangle_enabled_flag && merge_affine_flag[x0][y0] == 0 && cbWidth + cbHeight > 12 ) | |
| merge_triangle_flag[x0][y0] | ae(v) |
| If( merge_triangle_flag [x0][y0] == 1 ) | |
| merge_triangle_idx[x0][y0] | ae(v) |
| if(mergeCandidateIsBi(mergeList[merge_triangle_idx[x0][y0] ] && (cbWidth + cbHeight) > cbBiSizeLimit) | |
| refpiclist_indicator_flag[ x0 ][ y0 ] | ae(v) |
| If( merge_affine_flag[x0][y0] == 0 && merge_triangle_flag[x0][y0] = = 0 && MaxNumMergeCand > 1 ) | |
| merge_idx[x0][y0] | ae(v) |
| } else { | |
| merge_flag[x0][y0] | ae(v) |

-continued

```
                                                                          Descriptor
    If( merge_flag[x0][y0] ) {
      If( sps_affine_enabled_flag && cbWidth >= 8 && cbHeight >= 8 &&
        (MotionModelIdc[x0−1][ y0+cbHeight−1]   !=   0   | |
         MotionModelIdc[x0−1][ y0+cbHeight]   !=   0   | |
         MotionModelIdc[x0−1][ y0−1]   !=   0   | |
         MotionModelIdc[x0+cbWidth−1 ][y0−1]   !=   0   | |
         MotionModelIdc[x0+cbWidth][y0−1] != 0 ) )
        merge_affine_flag[x0][y0]                                         ae(v)
      If(slice_type == B && sps_triangle_enabled_flag &&
        merge_affine_flag[x0][y0] == 0 && cbWidth + cbHeight > 12)
        merge_triangle_flag[x0][y0]                                       ae(v)
      If( merge_triangle_flag [x0][y0] == 1 )
        merge_triangle_idx[x0][y0]                                        ae(v)
      if(mergeCandidateIsBi(mergeList[merge_triangle_idx[x0][y0]]
      && (cbWidth + cbHeight) > cbBiSizeLimit)
      refpiclist_indicator_flag[ x0 ][ y0 ]                               ae(v)
      If( merge_affine_flag[x0][y0] == 0 &&
        merge_triangle_flag[x0][y0] == 0 && MaxNumMergeCand > 1)
        merge_idx[x0][y0]                                                 ae(v)
    } else {
    ...
```

Whether method 1 or method 2 is used, may be determined in the following ways:

- It is configured in the sequence parameter set that all triangular prediction mode blocks use method 1 or method 2.
- It is determined from the block size, if method 1 or method 2 is used. Method 1 may be used for examples for blocks smaller or equal to 16×16 luma samples. Otherwise, method 2 may be used.

Motion Vector Storage

Figure 15:
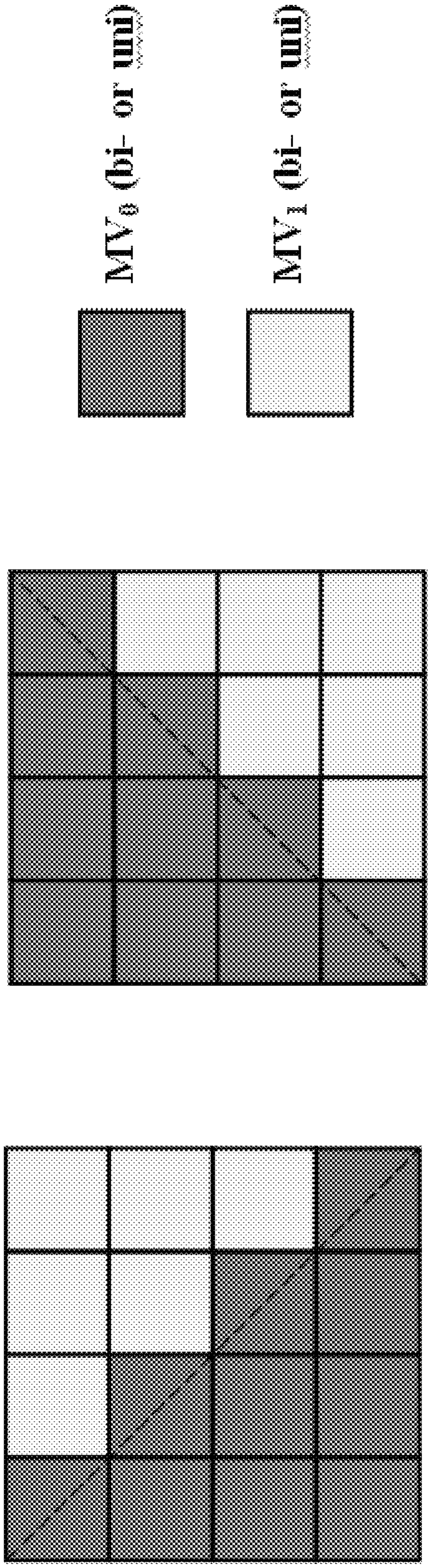
FIG. 15 shows a schematic diagram illustrating motion vector storage for triangular partitions according to fixed rule (PU0).

The original, unmodified bi-prediction candidate that was indicated by the merge index is used in the motion vector storage This is illustrated in FIG. 15: The derived uni-prediction motion vector is only used for motion compensation. For storage, the unmodified bi-predictive MV candidate (i.e. as selected from the MCL) is kept and put into the motion field for future referencing.

For the actual storage, it is further proposed not to calculate an average for the 4×4 subblocks that cross the diagonals such as in prior art, but rather assign the 4×4 blocks that cross the diagonals to either the first or the second partition (i.e. the two triangular blocks PU0 and PU1) and store the motion info according to this definite assignment. This is exemplified in FIG. 16

Note that MV0 and MV1 may relate to a uni- or bi-prediction motion vector.

One possible fixed rule shown in FIG. 8 always assigns the 4×4 blocks that are sliced by the diagonal to the partition PU0.

Figure 16:
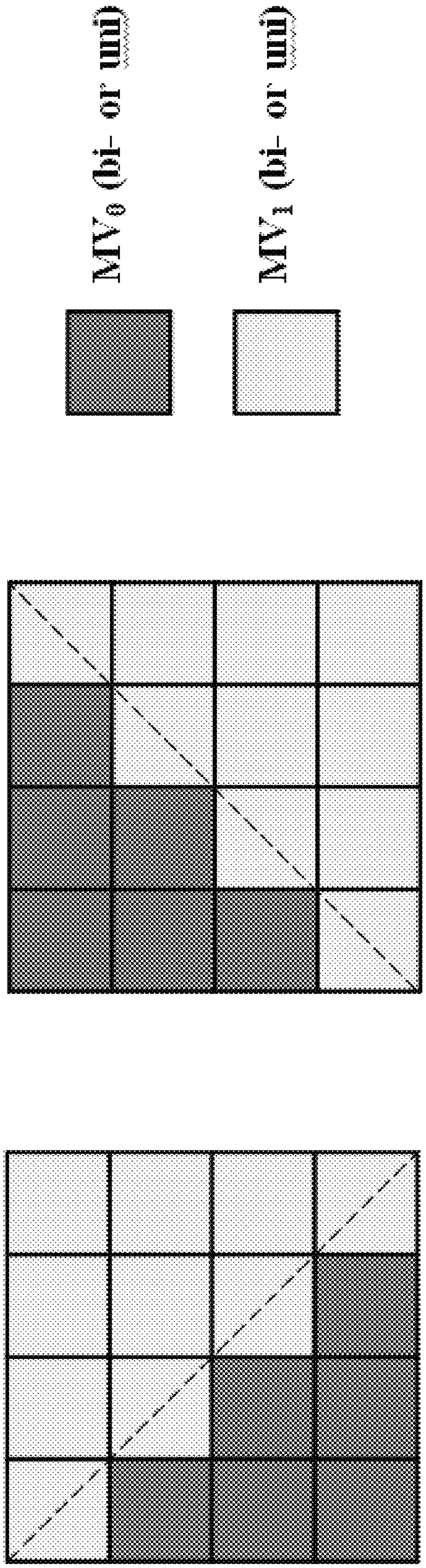
FIG. 16 shows a schematic diagram illustrating motion vector storage for triangular partitions according to fixed rule (PU1).

Another possible fixed rule shown in FIG. 16 always assigns the 4×4 blocks that are sliced by the diagonal to the partition PU1.

Further, in another possible solution, it can be inferred from additional conditions if the diagonal 4×4 blocks are assigned to $PU_0$ or $PU_1$. This decision can for example be made based on

Figure 17:
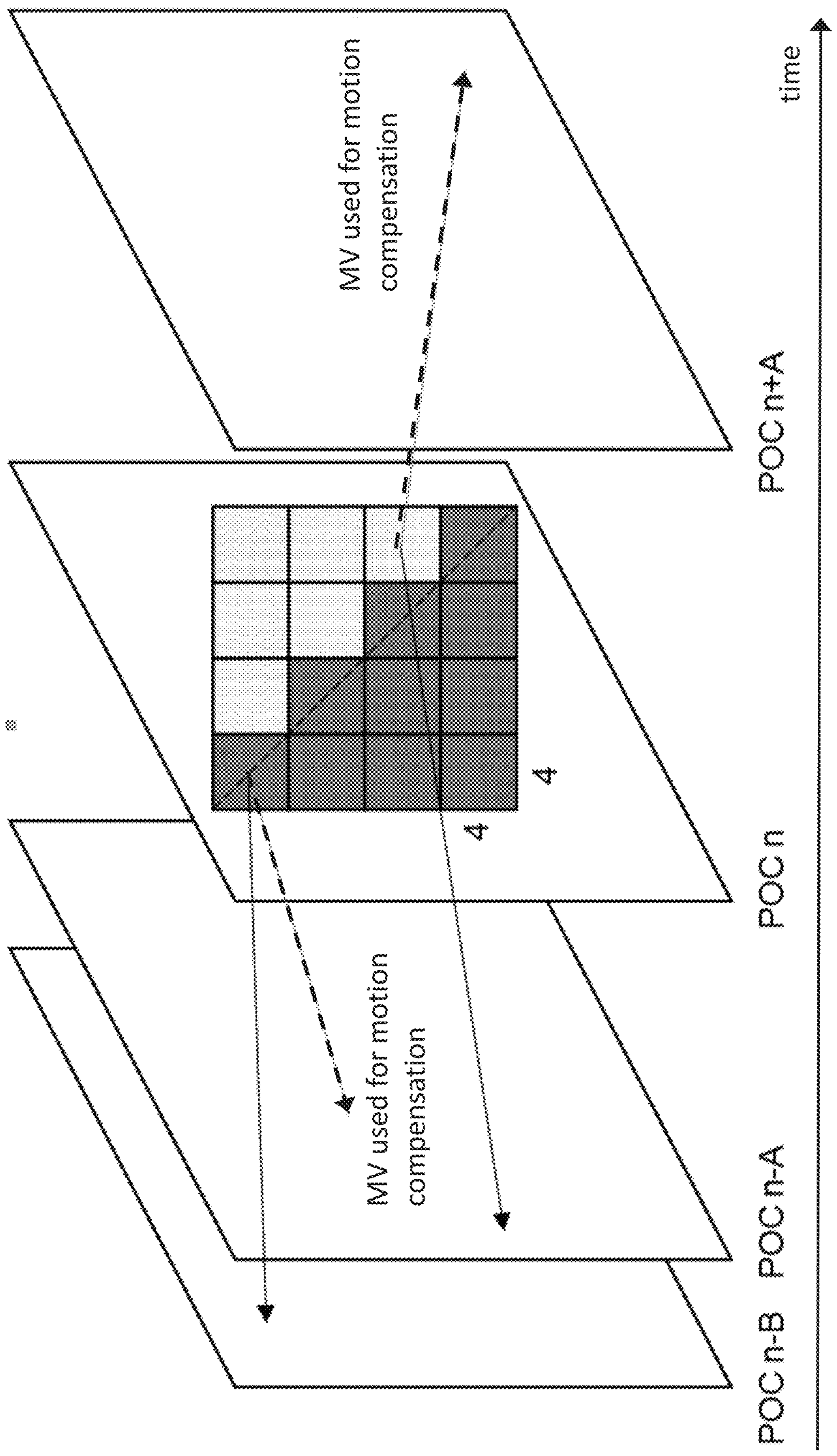
FIG. 17 shows a schematic diagram illustrating visualization of difference between bi-prediction motion vectors used for actual prediction (red) and only used for storage (black).

- the properties (magnitude, reference picture index) of $MV_0$ and $MV_1$.
- the block size of the current triangular partitioned block FIG. 17 exemplifies the result of the uni-prediction candidate derivation and motion vector storage. The motion vectors (dashed lines) are used for the actual motion compensation and the motion vectors (solid lines) are used for storage only.

Note that for PU0 (dark grey), the motion vector was selected which relates to a reference picture with a temporal distance to the current picture smaller than the temporal distance of the second reference picture. For PU1, the absolute temporal distance of both reference pictures is equal, i.e. TD0=TD1. Therefore, in accordance with option 1.c discussed above, the motion vector with the smaller magnitude was selected for motion compensation. The temporal distance between a current picture and a reference picture, to which a MV refers to, is also referred to as POC distance.

According to a fourth embodiment, an apparatus is provided for derivation of motion vectors, MVs, for a coding block, comprising: a candidate list generating unit, configured to generate a merge candidate list for the coding block partitioned into two triangle partitions when the coding block is enabled for a triangle merge mode, wherein during the generation of the merge candidate list, one or more spatial merge candidates are derived from neighboring coding units; and after the spatial merge candidates are derived, one or more temporal motion vector predictions, MVPs are directly or immediately derived; and an inter prediction processing unit, configured to derive uni-prediction MVs as motion vectors of the respective triangle partitions at least based on the merge candidate list.

Figure 18:
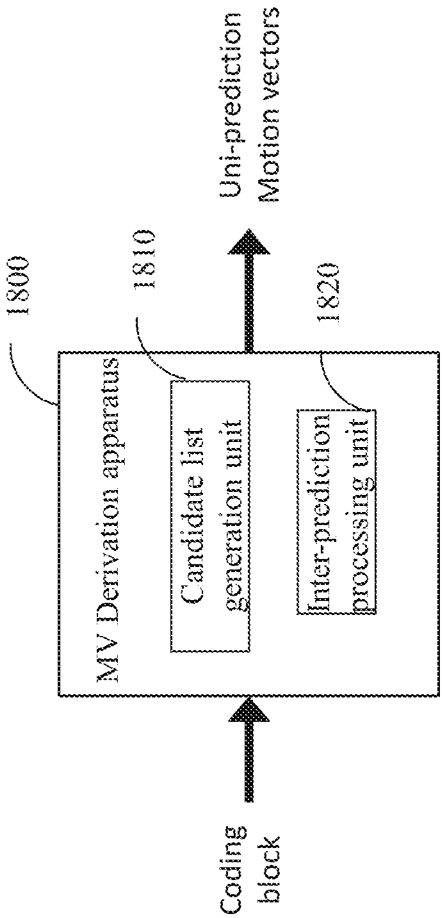
FIG. 18 shows a schematic diagram of a MV derivation apparatus.

FIG. 18 shows a MV derivation apparatus 1800, which includes a candidate list generation unit 1810 and an inter-prediction processing unit 1820. In an example, the apparatus 1800 may be corresponding to the inter prediction unit 244 in FIG. 2. In another example, the apparatus 1800 may be corresponding to the inter prediction unit 344 in FIG. 3.

According to a fifth embodiment, an apparatus is provided for generating a merge candidate list for a coding block, comprising: a candidate list generating unit, configured to generate a merge candidate list for the coding block partitioned into two triangle partitions when the coding block is enabled for a triangle merge mode, wherein during the generation of the merge candidate list one or more spatial merge candidates are derived from neighboring coding units; and after the spatial merge candidates are derived, one or more temporal motion vector predictions, MVPs, are directly or immediately derived; and the one or more spatial merge candidates and the derived one or more temporal MVPs are added to the merge candidate list, wherein the one or more spatial merge candidates and/or the one or more temporal MVPs comprise uni-prediction MVs or bi-prediction MVs.

Figure 19:
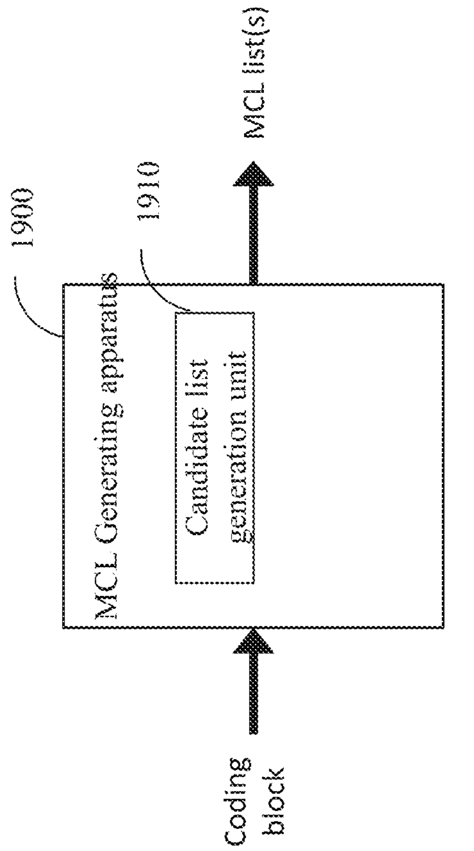
FIG. 19 shows a schematic diagram of a MCL generation apparatus.

FIG. 19 shows a merge candidate list, MCL, generation apparatus 1900, which includes a candidate list generation unit 1910. MCL generation apparatus 1900 uses as input a coding block and provides as output a merge candidate list MCL for the one and/or two triangle partitions of the coding block. In an example, the apparatus 1900 may be corresponding to the inter prediction unit 244 in FIG. 2. In another example, the apparatus 1900 may be corresponding to the inter prediction unit 344 in FIG. 3.

According to a sixth embodiment, an apparatus is provided for inter prediction of a current triangle partition of a coding block, comprising: a candidate list generating unit, configured to generate a merge candidate list for the coding block partitioned into two triangle partitions when the coding block is enabled for a triangle merge mode, wherein during the generation of the merge candidate list, one or more spatial merge candidates are derived from neighboring coding units; and after the spatial merge candidates are derived, one or more temporal motion vector predictions, MVPs, are directly or immediately derived; and an inter prediction processing unit, configured to derive uni-prediction MVs as motion vectors of the respective triangle partitions at least based on the merge candidate list and perform prediction of the current triangle partition at least based on the uni-prediction MV, to obtain predicted value of the current triangle partition.

Figure 20:
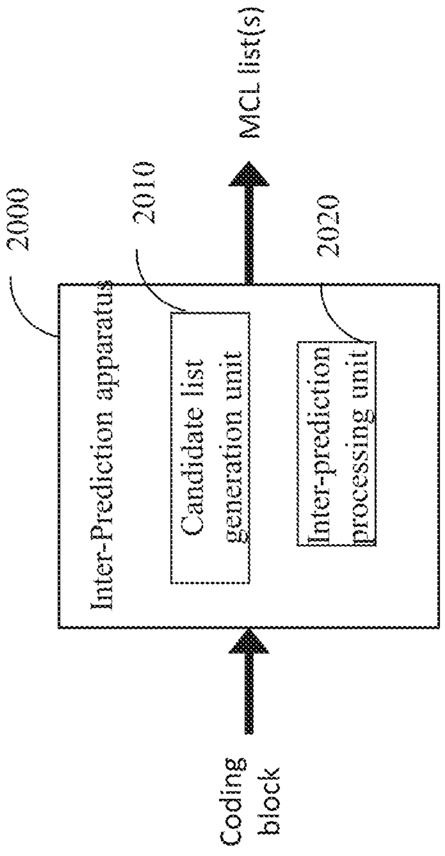
FIG. 20 shows a schematic diagram of an inter-prediction apparatus.

FIG. 20 shows an inter-prediction apparatus 2000, which includes a candidate list generation unit 2010 and an inter-prediction processing unit 2020. In an example, the apparatus 2000 may be corresponding to the inter prediction unit 244 in FIG. 2. In another example, the apparatus 2000 may be corresponding to the inter prediction unit 344 in FIG. 3.

According to an embodiment, the uni-prediction MV selection rule is any one of the following: if both the first MV from the REF_PIC_LIST0 and the second MV from the REF_PIC_LIST1 relate to a same reference picture, an average motion vector based on the first MV and the second MV is used as the uni-prediction MV; or if a reference picture index of the first MV relates to a reference picture with a temporal distance to a current picture, TD0, smaller than the temporal distance of the second MV to the current picture, TD1, the first MV is used as the uni-prediction MV; or if the second MV from the REF_PIC_LIST1 relates to a reference picture with a temporal distance to the current picture smaller than the temporal distance to the first MV, the second MV is used as the uni-prediction MV; or if the temporal distance to the current picture is equal for both the first MV and the second MV, the first MV from the REF_PIC_LIST0 or the second MV from REF_PIC_LIST1 which has a smaller magnitude is used as the uni-prediction MV. It can be understood that the uni-prediction MV selection rule is not limited to the above alternative designs, other implementation designs can be also considered. The uni-prediction MV selection rule for the triangle merge mode indicates how a first MV or a second MV of a bi-prediction MV of the merge candidate list is selected as a uni-prediction MV.

According to an embodiment, a decoding apparatus (200) is provided for decoding a video coding block of a current frame of an encoded video signal, wherein the decoding apparatus (200) comprises: a decoding unit (205, 207) configured to decode the video coding block for providing a residual video coding block; an inter prediction unit (215) configured to: generate a predicted video coding block based on a uni-prediction motion vector, MV, which is derived for a triangle partition of the video coding block for triangle merge mode, wherein bi-prediction motion vectors, MVs, are allowed for motion vector storage for at least one 4×4 sub-block for the triangle merge mode, and perform uni-directional motion compensation; and a reconstruction unit (209) configured to reconstruct the video coding block based on the filtered predicted video coding block and the residual video coding block.

Figure 21:
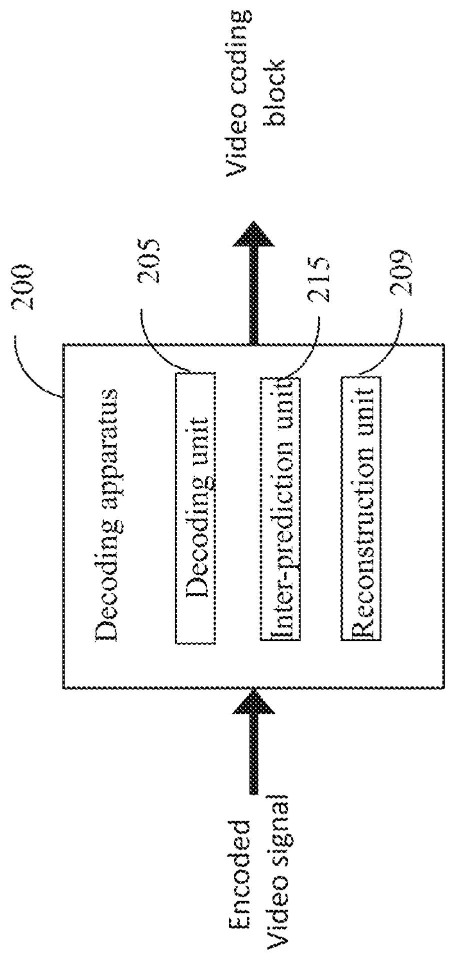
FIG. 21 shows a schematic diagram of a decoding apparatus.

FIG. 21 shows a decoding apparatus 200, which includes a decoding unit 205, an inter-prediction unit 215, and a reconstruction unit 209. In an example, the decoding apparatus 200 may be corresponding to the decoder in FIG. 3.

According to an aspect of the present disclosure, an apparatus is provided for performing uni-directional (or uni-prediction) motion compensation for triangle merge mode of a coding block, partitioned into two triangle partitions, of a current frame of a video signal, wherein the apparatus comprises: a processing circuitry configured to: derive for each of the two triangle partitions a uni-prediction motion vector, MV, based on a uni-prediction MV selection rule for the triangle merge mode and a merge candidate list; perform motion compensation of each of the two triangle partitions using the corresponding uni-prediction MV; and obtain a predicted coding block based on the two motion compensated triangle partitions.

Figure 22:
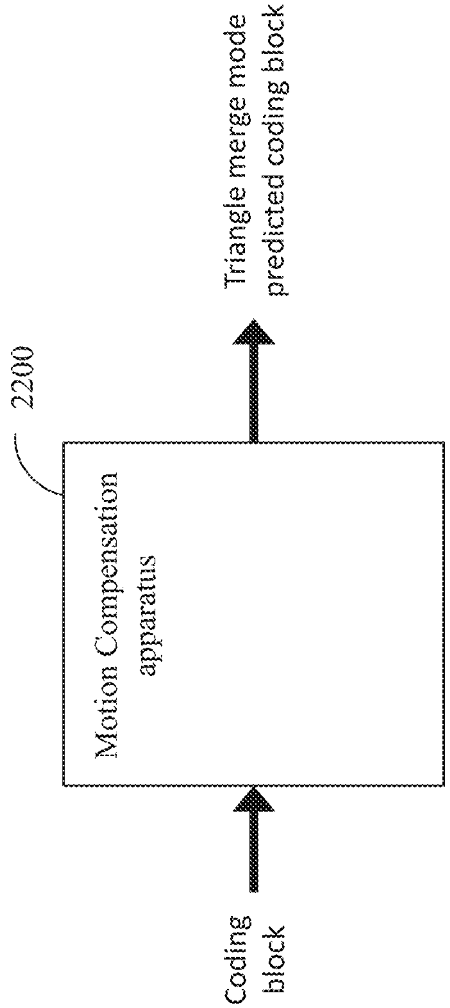
FIG. 22 shows a schematic diagram for an inter-prediction apparatus.

FIG. 22 shows a motion compensation apparatus 2200. In an example, the apparatus 2200 may be corresponding to the inter prediction unit 244 in FIG. 2. In another example, the apparatus 2200 may be corresponding to the inter prediction unit 344 in FIG. 3.

According to an embodiment, the merge candidate list comprises uni-prediction motion vector, MV, candidates and/or bi-prediction motion vector, MV, candidates, wherein a bi-prediction MV candidate includes a first MV and a second MV.

According to an embodiment, the deriving of the uni-prediction MV based on a uni-prediction MV selection rule for the triangle merge mode and a merge candidate list includes: if both the first MV from the REF_PIC_LIST0 and the second MV from the REF_PIC_LIST1 relate to a same reference picture, an average motion vector based on the first MV and the second MV is derived as the uni-prediction MV.

According to an embodiment, the deriving of the uni-prediction MV based on a uni-prediction MV selection rule for the triangle merge mode and a merge candidate list includes: the first MV from the REF_PIC_LIST0 is derived as the uni-prediction MV, if a reference picture index of the first MV relates to a reference picture with a temporal distance to the current picture, TD0, smaller than the temporal distance, TD1, of the second MV to the current picture; or the second MV from the REF_PIC_LIST1 is derived as the uni-prediction MV, if the second MV relates to a reference picture with a temporal distance to the current picture, TD1, smaller than the temporal distance of the first MV.

According to an embodiment, the deriving of the uni-prediction MV based on a uni-prediction MV selection rule for the triangle merge mode and a merge candidate list includes: the first MV from the REF_PIC_LIST0 or the second MV from REF_PIC_LIST1 with a smaller magnitude is derived as the uni-prediction MV, if a temporal distance of the first MV and the second MV to the current picture is equal.

According to an embodiment, the deriving of the uni-prediction MV is based on a uni-prediction MV selection rule for the triangle merge mode and a merge candidate list includes: if both the first MV from the REF_PIC_LIST0 and the second MV from the REF_PIC_LIST1 relate to a same reference picture, an average motion vector based on the first MV and the second MV is derived as the uni-prediction MV; or if a reference picture index of the first MV relates to a reference picture with a temporal distance to the current picture, TD0, smaller than the temporal distance of the second MV to the current picture, TD1, the first MV is derived as the uni-prediction MV; or if the second MV from the REF_PIC_LIST1 relates to a reference picture with a temporal distance to the current picture smaller than the temporal distance to the first MV, the second MV is derived as the uni-prediction MV; or if the temporal distance to the current picture is equal for both the first MV and the second MV, the first MV from the REF_PIC_LIST0 or the second MV from REF_PIC_LIST1 which has a smaller magnitude is derived as the uni-prediction MV candidate.

According to an embodiment, an encoding apparatus (20) is provided for encoding a coding block of a current frame of a video signal, wherein the encoding apparatus (20) comprises: an encoding unit (204, 270) configured to encode the coding block for providing a residual coding block; an inter prediction unit (244) configured to generate a predicted coding block according to any of the previous embodiments; and a reconstruction unit (214) configured to reconstruct the coding block based on the predicted coding block and the residual coding block. The respective encoding apparatus is shown in FIG. 2.

According to an embodiment, a decoding apparatus (30) is provided for decoding according block of a current frame of a video signal, wherein the decoding apparatus (30) comprises: a decoding unit (304) configured to decode the coding block for providing a residual coding block; an inter prediction unit (344) configured to generate a predicted coding block according to any of the previous embodiments; and a reconstruction unit (314) configured to reconstruct the coding block based on the predicted coding block and the residual coding block. The respective decoding apparatus is shown in FIG. 3.

According to an embodiment, an encoder is provided comprising a processing circuitry for carrying out the method according to any one of the previous embodiments.

According to an embodiments, a decoder comprising processing circuitry for carrying out the method according to any one of the previous embodiments.

According to an embodiments, a computer program product is provided comprising a program code for performing the method according to any one of the previous embodiments.

According to an embodiment, a decoder is provided, comprising: one or more processors; and a non-transitory computer-readable storage medium coupled to the processors and storing programming for execution by the processors, wherein the programming, when executed by the processors, configures the decoder to carry out the method according to any one of the previous embodiments.

According to an embodiment, an encoder is provided, comprising: one or more processors; and a non-transitory computer-readable storage medium coupled to the processors and storing programming for execution by the processors, wherein the programming, when executed by the processors, configures the encoder to carry out the method according to any one of the previous embodiments.

The following provides an explanation of the applications of the encoding method as well as the decoding method as shown in the above-mentioned embodiments, and a system using them.

Figure 23:
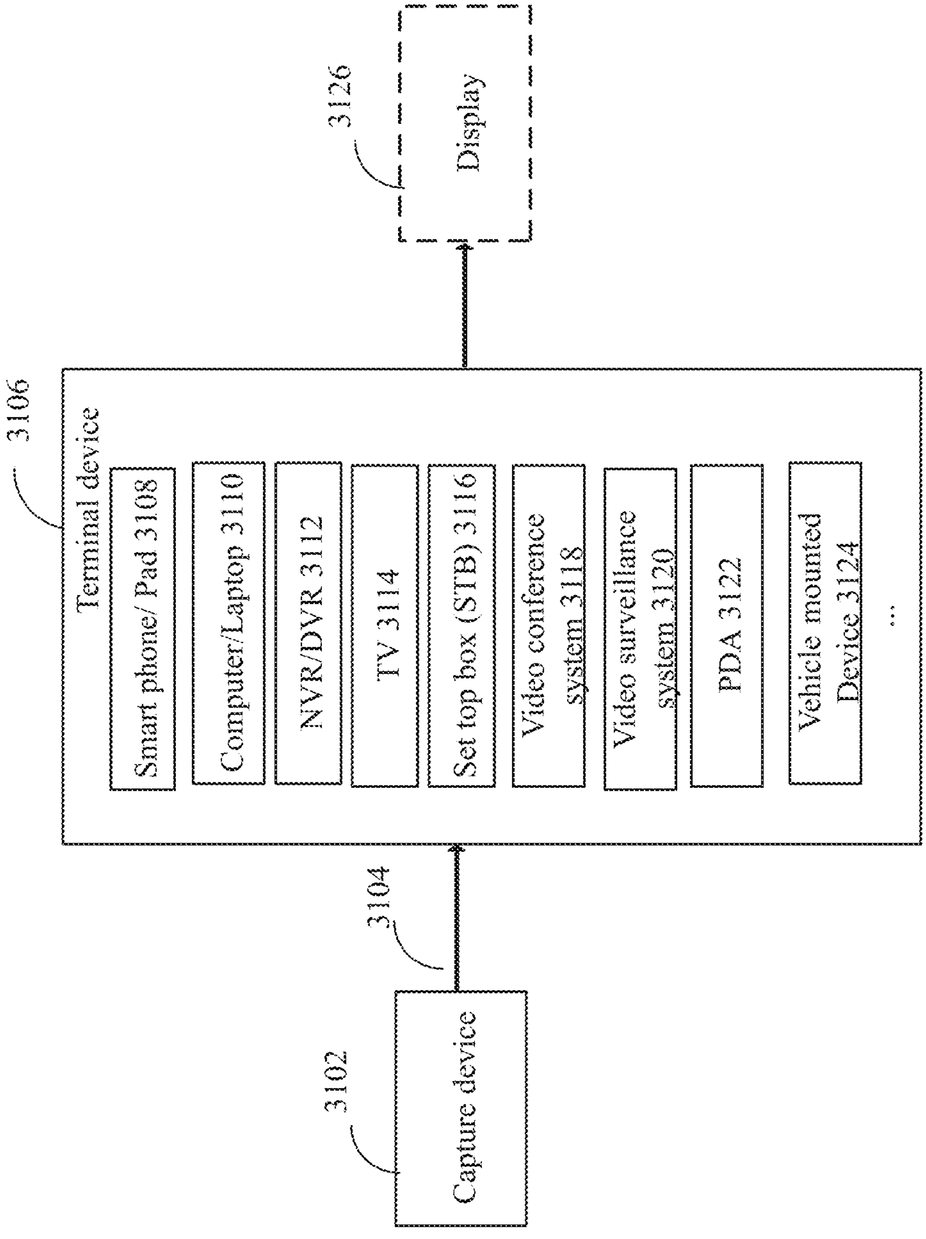
FIG. 23 is a block diagram showing an example structure of a content supply system which provides a content delivery service.

FIG. 23 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 24:
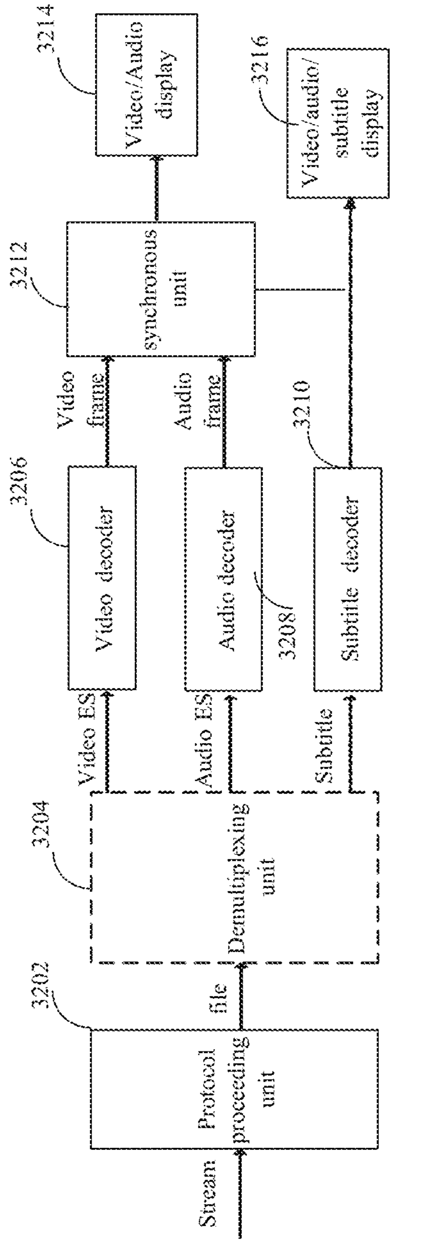
FIG. 24 is a block diagram showing a structure of an example of a terminal device.

FIG. 24 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

Summarizing, the present disclosure relates to video encoding and decoding. For that purpose, an apparatus and methods derive motion vectors, MVs, for a coding block. In particular, when the coding block is enabled for a triangle merge mode, a merge candidate list for the coding block partitioned into two triangle partitions. The merge candidate list generation includes deriving one or more spatial merge candidates from neighboring coding units. After the spatial merge candidates are derived, directly or immediately one or more temporal motion vector predictions, MVPs are derived. Uni-prediction MVs are then derived as motion vectors of the respective triangle partitions based on the merge candidate list, which comprises one or more uni-prediction MVs and/or one or more bi-prediction MVs. The derivation of a uni-directional MV is based on the merge candidate or a uni-directional MV selection rule. A triangle partition of the coding block is then predicted at least based on the uni-prediction MV, to obtain a predicted value of the triangle partition.

Further embodiments of the present invention are provided in the following. It should be noted that the numbering used in the following section does not necessarily need to comply with the numbering used in the previous sections.

Embodiment 1. A decoding apparatus (200) for decoding a video coding block of a current frame of an encoded video signal, wherein the decoding apparatus (200) comprises: a decoding unit (205) configured to decode the video coding block for providing a residual video coding block; an inter prediction unit (215) configured to generate a predicted video coding block, wherein bi-predictive motion vectors are allowed for motion vector storage for all 4×4 sub-blocks of a triangular partition, and uni-directional motion compensation is performed; and a reconstruction unit (209) configured to reconstruct the video coding block on the basis of the filtered predicted video coding block and the residual video coding block.

Embodiment 2. A decoding apparatus (200) for decoding a video coding block of a current frame of an encoded video signal, wherein the decoding apparatus (200) comprises: a decoding unit (205) configured to decode the video coding block for providing a residual video coding block; an inter prediction unit (215) configured to generate a predicted video coding block based on a uni-directional motion vector which is derived for a triangular block (such as a triangular prediction unit), and uni-directional motion compensation is performed; and a reconstruction unit (209) configured to reconstruct the video coding block on the basis of the filtered predicted video coding block and the residual video coding block.

Embodiment 3. The decoding apparatus (200) of embodiment 2, wherein for a triangular block (such as a triangular prediction unit), a uni-directional motion vector is derived from the first (REF_PIC_LIST0) and second (REF_PIC_LIST1) motion vector according to the following criterions:

a. If both the REF_PIC_LIST0 and the REF_PIC_LIST1 motion vector relate to the same reference picture, calculate an average motion vector.

Embodiment 4. The decoding apparatus (200) of embodiment 2, wherein for a triangular block (such as a triangular prediction unit), a uni-directional motion vector is derived from the first (REF_PIC_LIST0) and second (REF_PIC_LIST1) motion vector according to the following criterions:

a. Otherwise if the reference picture index of the REF_PIC_LIST0 motion vector relates to a reference picture with a smaller temporal to the current picture than the REF_PIC_LIST1 motion vector, use the REF_PIC_LIST0 motion vector. Otherwise, if the REF_PIC_LIST1 motion vector relates to a reference picture with a temporal distance to the current picture smaller than the temporal distance to the REF_PIC_LIST0 motion vector, use the REF_PIC_LIST1 motion vector.

Embodiment 5. The decoding apparatus (200) of embodiment 2, wherein for a triangular block (such as a triangular prediction unit), a uni-directional motion vector is derived from the first (REF_PIC_LIST0) and second (REF_PIC_LIST1) motion vector according to the following criterions:

a. Otherwise if the temporal distance to the current picture is equal for both REF_PIC_LIST0 and REF_PIC_LIST1 motion vectors, use the motion vector which has a smaller magnitude.

Embodiment 6. The decoding apparatus (200) of embodiment 2, wherein for a triangular block (such as a triangular prediction unit), a uni-directional motion vector is derived from the first (REF_PIC_LIST0) and second (REF_PIC_LIST1) motion vector according to any one of the following criterions:

a. If both the REF_PIC_LIST0 and the REF_PIC_LIST1 motion vector relate to the same reference picture, calculate an average motion vector; or b. Otherwise if the reference picture index of the REF_PIC_LIST0 motion vector relates to a reference picture with a smaller temporal to the current picture than the REF_PIC_LIST1 motion vector, use the REF_PIC_LIST0 motion vector. Otherwise, if the REF_PIC_LIST1 motion vector relates to a reference picture with a temporal distance to the current picture smaller than the temporal distance to the REF_PIC_LIST0 motion vector, use the REF_PIC_LIST1 motion vector. or c. Otherwise if the temporal distance to the current picture is equal for both REF_PIC_LIST0 and REF_PIC_LIST1 motion vectors, use the motion vector which has a smaller magnitude.

Embodiment 7. A method for deriving uni-directional motion vector for a triangular block (such as a triangular prediction unit), comprising: A uni-directional motion vector is derived from the first (REF_PIC_LIST0) and second (REF_PIC_LIST1) motion vector according to the following criterions:

a. If both the REF_PIC_LIST0 and the REF_PIC_LIST1 motion vector relate to the same reference picture, calculate an average motion vector.

Embodiment 8. A method for deriving uni-directional motion vector for a triangular block (such as a triangular prediction unit), comprising: A uni-directional motion vector is derived from the first (REF_PIC_LIST0) and second (REF_PIC_LIST1) motion vector according to the following criterions:

a. Otherwise if the reference picture index of the REF_PIC_LIST0 motion vector relates to a reference picture with a smaller temporal to the current picture than the REF_PIC_LIST1 motion vector, use the REF_PIC_LIST0 motion vector.

b. Otherwise, if the REF_PIC_LIST1 motion vector relates to a reference picture with a temporal distance to the current picture smaller than the temporal distance to the REF_PIC_LIST0 motion vector, use the REF_PIC_LIST1 motion vector.

Embodiment 9. A method for deriving uni-directional motion vector for a triangular block (such as a triangular prediction unit), comprising: A uni-directional motion vector is derived from the first (REF_PIC_LIST0) and second (REF_PIC_LIST1) motion vector according to the following criterions:

a. Otherwise if the temporal distance to the current picture is equal for both REF_PIC_LIST0 and REF_PIC_LIST1 motion vectors, use the motion vector which has a smaller magnitude.

Embodiment 10. A method for deriving uni-directional motion vector for a triangular block (such as a triangular prediction unit), comprising: A uni-directional motion vector is derived from the first (REF_PIC_LIST0) and second (REF_PIC_LIST1) motion vector according to any one of the following criterions:

a. If both the REF_PIC_LIST0 and the REF_PIC_LIST1 motion vector relate to the same reference picture, calculate an average motion vector; or b. Otherwise if the reference picture index of the REF_PIC_LIST0 motion vector relates to a reference picture with a smaller temporal to the current picture than the REF_PIC_LIST1 motion vector, use the REF_PIC_LIST0 motion vector.

c. Otherwise, if the REF_PIC_LIST1 motion vector relates to a reference picture with a temporal distance to the current picture smaller than the temporal distance to the REF_PIC_LIST0 motion vector, use the REF_PIC_LIST1 motion vector; or d. Otherwise if the temporal distance to the current picture is equal for both REF_PIC_LIST0 and REF_PIC_LIST1 motion vectors, use the motion vector which has a smaller magnitude.

Embodiment 11. An encoder comprising processing circuitry for carrying out the method according to any one of embodiments 7 to 10.

Embodiment 12. A decoder comprising processing circuitry for carrying out the method according to any one of embodiments 7 to 10.

Embodiment 13. A computer program product comprising a program code for performing the method according to any one of embodiments 7 to 10.

Embodiment 14. A decoder, comprises: one or more processors; and a non-transitory computer-readable storage medium coupled to the processors and storing programming for execution by the processors, wherein the programming, when executed by the processors, configures the decoder to carry out the method according to any one of embodiments 7 to 10.

Embodiment 15. An encoder, comprising: one or more processors; and a non-transitory computer-readable storage medium coupled to the processors and storing programming for execution by the processors, wherein the programming, when executed by the processors, configures the encoder to carry out the method according to any one of embodiments 7 to 10.

LIST OF REFERENCE SIGNS

FIG. 1A: 10 video coding system; 12 source device; 13 communication channel; 14 destination device; 16 picture source; 17 picture data; 18 pre-processor; 19 pre-processed picture data; 20 video encoder; 21 encoded picture data; 22 communication interface; 28 communication interface; 30 video decoder; 31 decoded picture data; 32 post processor; 33 post-processed picture data; 34 display device.

FIG. 1B: 40 video coding system; 41 imaging device(s); 42 antenna; 43 processor(s); 44 memory store(s); 45 display device; 46 processing circuitry; 20 video encoder; 30 video decoder.

FIG. 2: 17 picture (data); 19 pre-processed picture (data); 20 encoder; 21 encoded picture data; 201 input (interface); 204 residual calculation [unit or step]; 206 transform processing unit; 208 quantization unit; 210 inverse quantization unit; 212 inverse transform processing unit; 214 reconstruction unit; 220 loop filter unit; 230 decoded picture buffer (DPB); 260 mode selection unit; 270 entropy encoding unit; 272 output (interface); 244 inter prediction unit; 254 intra prediction unit; 262 partitioning unit; 203 picture block; 205 residual block; 213 reconstructed residual block; 215 reconstructed block; 221 filtered block; 231 decoded picture; 265 prediction block; 266 syntax elements; 207 transform coefficients; 209 quantized coefficients; 211 dequantized coefficients.

FIG. 3: 21 encoded picture data; 30 video decoder; 304 entropy decoding unit; 309 quantized coefficients; 310 inverse quantization unit; 311 dequantized coefficients; 312 inverse transform processing unit; 313 reconstructed residual block; 314 reconstruction unit; 315 reconstructed block; 320 loop filter; 321 filtered block; 330 decoded picture buffer DBP; 331 decoded picture; 360 mode application unit; 365 prediction block; 366 syntax elements; 344 inter prediction unit; 354 intra prediction unit.

FIG. 4: 400 video coding device; 410 ingress ports/input ports; 420 receiver units Rx; 430 processor; 440 transmitter units Tx; 450 egress ports/output ports; 460 memory; 470 coding module.

FIG. 5: 500 source device or destination device; 502 processor; 504 memory; 506 code and data; 508 operating system; 510 application programs; 512 bus; 518 display.

The invention claimed is:

1. A method of video encoding implemented by an encoding apparatus, wherein the method comprises:

performing, for a coding block that is enabled for a geometric partition merge mode and that is partitioned into a first geometric partition and a second geometric partition, an inter prediction process for the coding block by:

generating a merge candidate list for the coding block, wherein the merge candidate list comprises one or more uni-prediction motion vectors (MVs) and one or more bi-prediction MVs, wherein the one or more bi-prediction MVs comprise a first bi-prediction MV, each of the one or more bi-prediction MVs having a first MV corresponding to a first reference picture list (REF_PIC_LIST0) and a second MV corresponding to a second reference picture list (REF_PIC_LIST1);

selecting, for the first geometric partition, a first merge candidate from the merge candidate list;

wherein if the selected first merge candidate is the first bi-prediction MV having a first MV corresponding to a first reference picture list (REF_PIC_LIST0) and a second MV corresponding to a second reference picture list (REF_PIC_LIST1), an uni-prediction candidate derivation process is invoked, an input to the uni-prediction candidate derivation process is the first bi-prediction motion vector, an output to the uni-prediction candidate derivation process is a first uni-prediction MV excluding from the one or more uni-prediction MVs, and the first uni-prediction MV is of the first geometric partition;

selecting, for the second geometric partition, a second merge candidate from the merge candidate list;

wherein if the selected second merge candidate is the second bi-prediction MV having a first MV corresponding to a first reference picture list (REF_PIC_LIST0) and a second MV corresponding to a second reference picture list (REF_PIC_LIST1), the uni-prediction candidate derivation process is invoked, an input to the uni-prediction candidate derivation process is the second bi-prediction MV, an output to the uni-prediction candidate derivation process is a second uni-prediction MV excluding from the one or more uni-prediction MVs, and the second uni-prediction MV is of the second geometric partition;

performing inter prediction for the first geometric partition based on the first uni-prediction MV to obtain a first predicted value of the first geometric partition; and performing inter prediction for the second geometric partition based on the second uni-prediction MV to obtain a second predicted value of the second geometric partition;

performing a transform process and a quantization process on a residual block to obtain residual information, wherein the residual block is based on the coding block and a prediction block that is of a current block and that has the first predicted value and the second predicted value; and performing entropy encoding on information for use in decoding to obtain an encoded bitstream, wherein the information comprises the residual information, information about the geometric partition merge mode of the coding block, a first merge index indicating the first merge candidate, and a second merge index indicating the second merge candidate.

2. The method of claim 1, wherein the uni-prediction candidate derivation process comprises deriving, based on a uni-prediction MV selection rule for the geometric partition merge mode, a uni-prediction MV as the motion vector of a current geometric partition from a selected bi-prediction MV, wherein the uni-prediction MV selection rule indicates a first MV or a second MV of the selected bi-prediction MV of the merge candidate list is selected as the uni-prediction MV.

3. The method of claim 2, wherein the uni-prediction MV selection rule is using the first MV as the uni-prediction MV when a reference picture index of the first MV relates to a reference picture with a temporal distance to a current picture, TD0, smaller than the temporal distance of the second MV to the current picture, TD1.

4. A method of video decoding implemented by a decoding apparatus, wherein the method comprises:

performing entropy decoding on a bitstream, to obtain information for use in decoding, wherein the information comprises information about a geometric partition merge mode of a coding block, a first merge index, a second merge index and residual information;

performing, for the coding block enabled for the geometric partition merge mode and that is partitioned into a first geometric partition and a second geometric partition, an inter prediction process for the coding block by:

generating a merge candidate list for the coding block, wherein the merge candidate list comprises one or more uni-prediction motion vectors (MVs) and one or more bi-prediction MVs, wherein the one or more bi-prediction MVs comprise a first bi-prediction MV and a second bi-prediction MV, each of the one or more bi-prediction MVs having a first MV corresponding to a first reference picture list (REF_PIC_LIST0) and a second MV corresponding to a second reference picture list (REF_PIC_LIST1);

selecting, for the first geometric partition, a first merge candidate from the merge candidate list based on the first merge index, wherein the first merge index indicates the first merge candidate for the first geometric partition;

wherein if the selected first merge candidate is the first bi-prediction MV having a first MV corresponding to a first reference picture list (REF_PIC_LIST0) and a second MV corresponding to a second reference picture list (REF_PIC_LIST1), a uni-prediction candidate derivation process is invoked, an input to the uni-prediction candidate derivation process is the first bi-prediction motion vector, an output to the uni-prediction candidate derivation process is a first uni-prediction MV excluding from the one or more uni-prediction MVs, and wherein the first uni-prediction MV is of the first geometric partition;

selecting, for the second geometric partition, a second merge candidate from the merge candidate list based on the second merge index, wherein the second merge index indicates the second merge candidate for the second geometric partition;

wherein if the selected second merge candidate is the second bi-prediction MV having a first MV corresponding to a first reference picture list (REF_PIC_LIST0) and a second MV corresponding to a second reference picture list (REF_PIC_LIST1), the uni-prediction candidate derivation process is invoked, an input to the uni-prediction candidate derivation process is the second bi-prediction MV, an output to the uni-prediction candidate derivation process is a second uni-prediction MV excluding from the one or more uni-prediction MVs, and the second uni-prediction MV is of the second geometric partition;

performing inter prediction for the first geometric partition based on the first uni-prediction MV to obtain a first predicted value of the first geometric partition; and performing inter prediction for the second geometric partition based on the second uni-prediction MV to obtain a second predicted value of the second geometric partition;

performing an inverse quantization process and an inverse transform process on the residual information, to obtain a residual block; and obtaining a reconstructed block of the coding block based on the residual block and a prediction block that is of the coding block and that has the first predicted value and the second predicted value.

5. The method of claim 4, wherein the uni-prediction candidate derivation process comprises deriving a uni-prediction MV as the motion vector of a current geometric partition from a selected bi-prediction MV based on a uni-prediction MV selection rule for the geometric partition merge mode, wherein the uni-prediction MV selection rule indicates a first MV or a second MV of the selected bi-prediction MV of the merge candidate list is selected as the uni-prediction MV.

6. The method of claim 5, wherein the uni-prediction MV selection rule is using the second MV as the uni-prediction MV when the second MV from the REF_PIC_LIST1 relates to a reference picture with a temporal distance to the current picture smaller than the temporal distance to the first MV.

7. An encoding apparatus, comprising:

one or more memories configured to store programming instructions; and at least one processor coupled to the one or more memories and configured to execute the instructions to cause the encoding apparatus to:

perform, for a coding block that is enabled for a geometric partition merge mode and that is partitioned into a first geometric partition and a second geometric partition, inter prediction process for the coding block by:

generating a merge candidate list for the coding block, wherein the merge candidate list comprises one or more uni-prediction motion vectors (MVs) and one or more bi-prediction MVs, wherein the one or more bi-prediction MVs comprise a first bi-prediction MV, each of the one or more bi-prediction MVs having a first MV corresponding to a first reference picture list (REF_PIC_LIST0) and a second MV corresponding to a second reference picture list (REF_PIC_LIST1);

selecting, for a first geometric partition, a first merge candidate from the merge candidate list;

wherein if the selected first merge candidate is the first bi-prediction MV having a first MV corresponding to a first reference picture list (REF_PIC_LIST0) and a second MV corresponding to a second reference picture list (REF_PIC_LIST1), an uni-prediction candidate derivation process is invoked, an input to the uni-prediction candidate derivation process is the first bi-prediction MV, an output to the uni-prediction candidate derivation process is a first uni-prediction MV excluding the one or more uni-prediction MVs, and the first uni-prediction MV is of the first geometric partition;

selecting, for the second geometric partition, a second merge candidate from the merge candidate list;

wherein if the selected second merge candidate is the second bi-prediction MV having a first MV corresponding to a first reference picture list (REF_PIC_LIST0) and a second MV corresponding to a second reference picture list (REF_PIC_LIST1), the uni-prediction candidate derivation process is invoked, an input to the uni-prediction candidate derivation process is the second bi-prediction MV, an output to the uni-prediction candidate derivation process is a second uni-prediction MV excluding the one or more uni-prediction MVs, and the second uni-prediction MV is of the second geometric partition;

performing inter prediction for the first geometric partition based on the first uni-prediction MV, to obtain a first predicted value of the first geometric partition; and performing inter prediction for the second geometric partition based on the second uni-prediction MV to obtain a second predicted value of the second geometric partition;

perform a transform process and a quantization process on a residual block, to obtain residual information, wherein the residual block is based on a coding block and a prediction block that is of a current block and that has the first predicted value and the second predicted value; and perform entropy encoding on information for use in decoding, to obtain an encoded bitstream, wherein the information comprises the residual information, information about the geometric partition merge mode of the coding block, a first merge index indicating the first merge candidate and a second merge index indicating the second merge candidate.

8. The encoding apparatus of claim 7, wherein the instructions, when executed by the at least one processor, causes the encoding apparatus to perform the uni-prediction candidate derivation process by deriving, based on a uni-prediction MV selection rule for the geometric partition merge mode, a uni-prediction MV of a current geometric partition from a selected bi-prediction MV, wherein the uni-prediction MV selection rule indicates a first MV or a second MV of the selected bi-prediction MV of the merge candidate list is selected as the uni-prediction MV.

9. The encoding apparatus of claim 8, wherein the uni-prediction MV selection rule is using the first MV from the REF_PIC_LIST0 or the second MV from REF_PIC_LIST1, whichever has a smaller magnitude, as the uni-prediction MV when the temporal distance to the current picture is equal for both the first MV and the second MV.

10. A decoding apparatus, comprising:

one or more memories storing programming instructions; and at least one processor coupled to the one or more memories and configured to execute the programming instructions to cause the decoding apparatus to:

perform entropy decoding on a bitstream, to obtain information for use in decoding, wherein the information comprises information about a geometric partition merge mode of a coding block, a first merge index, a second merge index and residual information;

perform, for the coding block enabled for the geometric partition merge mode and that is partitioned into a first geometric partition and a second geometric partition, an inter prediction process for the coding block by:

generating a merge candidate list for the coding block, wherein the merge candidate list comprises one or more uni-prediction motion vectors (MVs) and one or more bi-prediction MVs, wherein the one or more bi-prediction MVs comprise a first bi-prediction MV and a second bi-prediction MV, each of the one or more bi-prediction MVs having a first MV corresponding to a first reference picture list (REF_PIC_LIST0) and a second MV corresponding to a second reference picture list (REF_PIC_LIST1);

selecting, for the first geometric partition, a first merge candidate from the merge candidate list based on the first merge index, wherein the first merge index indicates the first merge candidate for the first geometric partition;

wherein if the selected first merge candidate is the first bi-prediction MV having a first MV corresponding to a first reference picture list (REF_PIC_LIST0) and a second MV corresponding to a second reference picture list (REF_PIC_LIST1), a uni-prediction candidate derivation process is invoked, an input to the uni-prediction candidate derivation process is the first bi-prediction MV, an output to the uni-prediction candidate derivation process is a first uni-prediction MV excluding from the one or more uni-prediction MVs, and wherein the first uni-prediction MV is of the first geometric partition;

selecting, for the second geometric partition, a second merge candidate from the merge candidate list based on the second merge index, wherein the second merge index indicates the second merge candidate for the second geometric partition;

wherein if the selected second merge candidate is the second bi-prediction MV having a first MV corresponding to a first reference picture list (REF_PIC_LIST0) and a second MV corresponding to a second reference picture list (REF_PIC_LIST1), the uni-prediction candidate derivation process is invoked, an input to the uni-prediction candidate derivation process is the second bi-prediction MV, an output to the uni-prediction candidate derivation process is a second uni-prediction MV excluding from the one or more uni-prediction MVs, and the second uni-prediction MV is of the second geometric partition;

performing inter prediction for the first geometric partition based on the first uni-prediction MV to obtain a first predicted value of the first geometric partition; and performing inter prediction for the second geometric partition based on the second uni-prediction MV to obtain a second predicted value of the second geometric partition;

perform an inverse quantization process and an inverse transform process on the residual information, to obtain a residual block; and obtain a reconstructed block of the coding block based on the residual block and a prediction block that is of the coding block and that has the first predicted value and the second predicted value.

11. The decoding apparatus of claim 10, wherein the uni-prediction candidate derivation process comprises deriving a uni-prediction MV of a current geometric partition from a selected bi-prediction MV based on a uni-prediction MV selection rule for the geometric partition merge mode, wherein the uni-prediction MV selection rule indicates a first MV or a second MV of the selected bi-prediction MV of the generated merge candidate list is selected as the uni-prediction MV.

12. The decoding apparatus of claim 11, wherein the uni-prediction MV selection rule uses the first MV as the uni-prediction MV when a reference picture index of the first MV relates to a reference picture with a temporal distance to a current picture, TD0, smaller than the temporal distance of the second MV to the current picture, TD1.

13. A non-transitory computer-readable medium storing computer instructions that, when executed by one or more processors, cause an encoding apparatus to:

perform, for a coding block that is enabled for a geometric partition merge mode and that is partitioned into a first geometric partition and a second geometric partition, an inter prediction process for the coding block by:

generating a merge candidate list for the coding block, wherein the merge candidate list comprises one or more uni-prediction motion vectors (MVs) and one or more bi-prediction MVs, wherein the one or more bi-prediction MVs comprise a first bi-prediction MV, each of the one or more bi-prediction MVs having a first MV corresponding to a first reference picture list (REF_PIC_LIST0) and a second MV corresponding to a second reference picture list (REF_PIC_LIST1);

selecting, for a first geometric partition, a first merge candidate from the merge candidate list;

wherein if the selected first merge candidate is the first bi-prediction MV having a first MV corresponding to a first reference picture list (REF_PIC_LIST0) and a second MV corresponding to a second reference picture list (REF_PIC_LIST1), an uni-prediction candidate derivation process is invoked, an input to the uni-prediction candidate derivation process is the first bi-prediction MV, an output to the uni-prediction candidate derivation process is a first uni-prediction MV excluding from the one or more uni-prediction MVs, and the first uni-prediction MV is of the first geometric partition;

selecting, for the second geometric partition, a second merge candidate from the merge candidate list;

wherein if the selected second merge candidate is the second bi-prediction MV having a first MV corresponding to a first reference picture list (REF_PIC_LIST0) and a second MV corresponding to a second reference picture list (REF_PIC_LIST1), the uni-prediction candidate derivation process is invoked, an input to the uni-prediction candidate derivation process is the second bi-prediction MV, an output to the uni-prediction candidate derivation process is a second uni-prediction MV excluding from the one or more uni-prediction MVs, and the second uni-prediction MV is of the second geometric partition;

performing inter prediction for the first geometric partition based on the first uni-prediction MV, to obtain a first predicted value of the first geometric partition; and performing inter prediction for the second geometric partition based on the second uni-prediction MV to obtain a second predicted value of the second geometric partition;

perform a transform process and a quantization process on a residual block to obtain residual information, wherein the residual block is based on the coding block and a prediction block that is of a current block and that has the first predicted value and the second predicted value; and performing entropy encoding on information for use in decoding, to obtain an encoded bitstream, wherein the information comprises the residual information, information about the geometric partition merge mode of the coding block, a first merge index indicating the first merge candidate and a second merge index indicating the second merge candidate.

14. The non-transitory computer-readable medium of claim 13, wherein the uni-prediction candidate derivation process comprises deriving, based on a uni-prediction MV selection rule for the geometric partition merge mode, a uni-prediction MV of a current geometric partition from a selected bi-prediction MV, wherein the uni-prediction MV selection rule indicates a first MV or a second MV of the selected bi-prediction MV of the merge candidate list is selected as the uni-prediction MV.

15. The non-transitory computer-readable medium of claim 14, wherein the uni-prediction MV selection rule uses the second MV as the uni-prediction MV when the second MV from the REF_PIC_LIST1 relates to a reference picture with a temporal distance to the current picture smaller than the temporal distance to the first MV.

16. A non-transitory computer-readable medium storing computer instructions that, when executed by one or more processors, cause a decoding apparatus to:

perform entropy decoding on a bitstream to obtain information for use in decoding, wherein the information comprises information about a geometric partition merge mode of a coding block that is partitioned into a first geometric partition and a second geometric partition, a first merge index, a second merge index and residual information;

perform, for the coding block enabled for the geometric partition merge mode and that is partitioned into a first geometric partition and a second geometric partition, inter prediction process for the coding block by:

generating a merge candidate list for the coding block, wherein the merge candidate list comprises one or more uni-prediction motion vectors (MVs) and one or more bi-prediction MVs, wherein the one or more bi-prediction MVs comprise a first bi-prediction MV and a second bi-prediction MV, each of the one or more bi-prediction MVs having a first MV corresponding to a first reference picture list (REF_PIC_LIST0) and a second MV corresponding to a second reference picture list (REF_PIC_LIST1);

selecting, for the first geometric partition, a first merge candidate from the merge candidate list based on the first merge index, wherein the first merge index indicates the first merge candidate for the first geometric partition;

wherein if the selected first merge candidate is the first bi-prediction MV having a first MV corresponding to a first reference picture list (REF_PIC_LIST0) and a second MV corresponding to a second reference picture list (REF_PIC_LIST1), a uni-prediction candidate derivation process is invoked, an input to the uni-prediction candidate derivation process is the first bi-prediction motion vector, an output to the uni-prediction candidate derivation process is a first uni-prediction MV excluding from the one or more uni-prediction MVs, and wherein the first uni-prediction MV is of the first geometric partition;

selecting, for the second geometric partition, a second merge candidate from the merge candidate list based on the second merge index, wherein the second merge index indicates the second merge candidate for the second geometric partition;

wherein if the selected second merge candidate is the second bi-prediction MV having a first MV corresponding to a first reference picture list (REF_PIC_LIST0) and a second MV corresponding to a second reference picture list (REF_PIC_LIST1), the uni-prediction candidate derivation process is invoked, an input to the uni-prediction candidate derivation process is the second bi-prediction MV, an output to the uni-prediction candidate derivation process is a second uni-prediction MV excluding from the one or more uni-prediction MVs, and the second uni-prediction MV is of the second geometric partition;

performing inter prediction for the first geometric partition based on the first uni-prediction MV to obtain a first predicted value of the first geometric partition; and performing inter prediction for the second geometric partition based on the second uni-prediction MV to obtain a second predicted value of the second geometric partition;

performing an inverse quantization process and an inverse transform process on the residual information, to obtain a residual block; and obtaining a reconstructed block of the coding block based on the residual block and a prediction block that is of the coding block and that has the first predicted value and the second predicted value.

17. The non-transitory computer-readable medium of claim 16, wherein the uni-prediction candidate derivation process comprises deriving a uni-prediction MV as the motion vector of a current geometric partition from a selected bi-prediction MV, based on a uni-prediction MV selection rule for the geometric partition merge mode, wherein the uni-prediction MV selection rule indicates a first MV or a second MV of the selected bi-prediction MV of the merge candidate list is selected as the uni-prediction MV.

18. The non-transitory computer-readable medium of claim 17, wherein the uni-prediction MV selection rule uses the first MV from the REF_PIC_LIST0 or the second MV from REF_PIC_LIST1, whichever has a smaller magnitude, as the uni-prediction MV when the temporal distance to the current picture is equal for both the first MV and the second MV.

19. A non-transitory computer-readable medium storing instructions comprising a bitstream that, when executed by at least one processor by a decoding device, cause the decoding device to generate a video, the bitstream comprising information for use in decoding the video, wherein the information for use in decoding the video comprises:

information about a geometric partition merge mode of a coding block that is partitioned into a first geometric partition and a second geometric partition, a first merge index, a second merge index, and residual information; and wherein, when the coding block is enabled for the geometric partition merge mode, the instructions are configured to cause the decoding device to perform an inter prediction operation for the coding block by:

generating a merge candidate list for the coding block, wherein the merge candidate list comprises one or more uni-prediction motion vectors (MVs) and one or more bi-prediction MVs, wherein the one or more bi-prediction MVs comprising a first bi-prediction MV and a second bi-prediction MV, each of the one or more bi-prediction MVs having a first MV corresponding to a first reference picture list (REF_PIC_LIST0) and a second MV corresponding to a second reference picture list (REF_PIC_LIST1); and selecting, for the first geometric partition, a first merge candidate from the merge candidate list based on the first merge index, wherein the first merge index indicates the first merge candidate for the first geometric partition;

wherein if the selected first merge candidate is the first bi-prediction MV having a first MV corresponding to a first reference picture list (REF_PIC_LIST0) and a second MV corresponding to a second reference picture list (REF_PIC_LIST1), a uni-prediction candidate derivation process is invoked, an input to the uni-prediction candidate derivation process is the first bi-prediction motion vector, an output to the uni-prediction candidate derivation process is a first uni-prediction MV excluding from the one or more uni-prediction MVs, and the first uni-prediction MV is of the first geometric partition;

selecting, for the second geometric partition, a second merge candidate from the merge candidate list based on the second merge index, wherein the second merge index indicates the second merge candidate for the second geometric partition;

wherein if the selected second merge candidate is the second bi-prediction MV having a first MV corresponding to a first reference picture list (REF_PIC_LIST0) and a second MV corresponding to a second reference picture list (REF_PIC_LIST1), the uni-prediction candidate derivation process is invoked, an input to the uni-prediction candidate derivation process is the second bi-prediction MV, an output to the uni-prediction candidate derivation process is a second uni-prediction MV excluding from the one or more uni-prediction MVs, and the second uni-prediction MV is of the second geometric partition;

performing inter prediction for the first geometric partition based on the first uni-prediction MV to obtain a first predicted value of the first geometric partition; and performing inter prediction for the second geometric partition based on the second uni-prediction MV to obtain a second predicted value of the second geometric partition.

20. The non-transitory computer-readable medium of claim 19, wherein the instructions, when decoded by the decoding device, further causes the decoding device to:

perform an inverse quantization process and an inverse transform process on the residual information, to obtain a residual block; and obtain a reconstructed block of the coding block based on the residual block and a prediction block that is of the coding block and that has the first predicted value and the second predicted value.

* * * * *